US007152072B2

(12) United States Patent
Dobrowski et al.

(10) Patent No.: US 7,152,072 B2
(45) Date of Patent: Dec. 19, 2006

(54) METHODS AND APPARATUS FOR IMPORTING DEVICE DATA INTO A DATABASE SYSTEM USED IN A PROCESS PLANT

(75) Inventors: Pat Dobrowski, Burnsville, MN (US); Sean Wilson, Eagan, MN (US); Nghy Hong, Apple Valley, MN (US); Eric Snyder, St. Paul, MN (US)

(73) Assignee: Fisher-Rosemount Systems Inc., Austin, TX (US)

( * ) Notice: Subject to any disclaimer, the term of this patent is extended or adjusted under 35 U.S.C. 154(b) by 513 days.

(21) Appl. No.: 10/338,392

(22) Filed: Jan. 8, 2003

(65) Prior Publication Data

US 2004/0133598 A1    Jul. 8, 2004

(51) Int. Cl.
*G06F 17/30* (2006.01)
*G06F 12/00* (2006.01)
(52) U.S. Cl. ............... 707/102; 707/100; 707/101; 707/103 R; 707/104.1
(58) Field of Classification Search ............. 707/7, 707/100, 101, 102, 103 R, 104.1, 200, 205
See application file for complete search history.

(56) References Cited

U.S. PATENT DOCUMENTS

| 4,527,271 A | 7/1985 | Hallee et al. |
| 4,607,325 A | 8/1986 | Horn |
| 4,657,179 A | 4/1987 | Aggers et al. |
| 4,734,873 A | 3/1988 | Malloy et al. |
| 4,763,243 A | 8/1988 | Barlow et al. |
| 4,764,862 A | 8/1988 | Barlow et al. |
| 4,885,694 A | 12/1989 | Pray et al. |
| 4,907,167 A | 3/1990 | Skeirik |
| 4,910,691 A | 3/1990 | Skeirik |
| 4,944,035 A | 7/1990 | Aagardl et al. |
| 4,956,793 A | 9/1990 | Bonne et al. |
| 4,965,742 A | 10/1990 | Skeirik |
| 5,006,992 A | 4/1991 | Skeirik |

(Continued)

FOREIGN PATENT DOCUMENTS

GB      2 319 866 A    6/1998

(Continued)

OTHER PUBLICATIONS

"Foreign Column Specification for Database Import/Export" IBM Technical Disclosure Bulletin, IBM Corp. New York, US, vol. 31, No. 10, Mar. 1, 1989, p. 313.
"AMS: the product," Emerson Process Management, available at emersonprocess.com/ams/products/index.htm on Sep. 18, 2002.
"Protocol Overview," Hart Communication Foundation, available at hartcomm.org/hcf/overview.html on Sep. 18, 2002.
"Protocol History," Hart Communication Foundation, available at hartcomm.org/hcf/history.html on Sep. 18, 2002.

*Primary Examiner*—Frantz Coby
(74) *Attorney, Agent, or Firm*—Marshall, Gerstein & Borun LLP

(57) ABSTRACT

A system and a methodology creates a mapping of a set of import parameters specifying a device in a first set of import data to a set of output parameters specifying the device in a first database. Such a mapping includes receiving the set of import parameters from an import file containing the first set of import data in a plurality of import records, each import record containing a plurality of import values, each import value corresponding to an import parameter from the set of import parameters; receiving the set of output parameters from the first database; and creating the mapping of the set of import parameters to the set of output parameters. The system and methodology described in here allows users to import data about various types of devices into a device database on a systematic and efficient method. Such a system and methodology also allows a user to maintain a complete database including all devices used within a process plant.

30 Claims, 21 Drawing Sheets

U.S. PATENT DOCUMENTS

| | | | |
|---|---|---|---|
| 5,008,810 A | 4/1991 | Kessel et al. | |
| 5,015,934 A | 5/1991 | Holley et al. | |
| 5,018,215 A | 5/1991 | Nasr et al. | |
| 5,043,863 A | 8/1991 | Bristol et al. | |
| 5,050,095 A | 9/1991 | Samad | |
| 5,070,458 A | 12/1991 | Gilmore et al. | |
| 5,121,467 A | 6/1992 | Skeirik | |
| 5,134,574 A | 7/1992 | Beaverstock et al. | |
| 5,140,530 A | 8/1992 | Guha et al. | |
| 5,142,612 A | 8/1992 | Skeirik | |
| 5,161,013 A | 11/1992 | Rylander et al. | |
| 5,167,009 A | 11/1992 | Skeirik | |
| 5,187,674 A | 2/1993 | Bonne | |
| 5,193,143 A | 3/1993 | Kaemmerer et al. | |
| 5,197,114 A | 3/1993 | Skeirik | |
| 5,212,765 A | 5/1993 | Skeirik | |
| 5,224,203 A | 6/1993 | Skeirik | |
| 5,282,261 A | 1/1994 | Skeirik | |
| 5,291,190 A | 3/1994 | Scarola et al. | |
| 5,301,101 A | 4/1994 | MacArthur et al. | |
| 5,311,447 A | 5/1994 | Bonne | |
| 5,333,298 A | 7/1994 | Bland et al. | |
| 5,351,184 A | 9/1994 | Lu et al. | |
| 5,353,207 A | 10/1994 | Keeler et al. | |
| 5,355,497 A * | 10/1994 | Cohen-Levy | 707/200 |
| 5,365,494 A * | 11/1994 | Lynch | 368/10 |
| 5,369,599 A | 11/1994 | Sadjadi et al. | |
| 5,373,452 A | 12/1994 | Guha | |
| 5,384,698 A | 1/1995 | Jelinek | |
| 5,390,326 A | 2/1995 | Shah | |
| 5,396,415 A | 3/1995 | Konar et al. | |
| 5,398,303 A | 3/1995 | Tanaka | |
| 5,408,406 A | 4/1995 | Mathur et al. | |
| 5,442,544 A | 8/1995 | Jelinek | |
| 5,486,920 A | 1/1996 | Killpatrick et al. | |
| 5,486,996 A | 1/1996 | Samad et al. | |
| 5,488,697 A | 1/1996 | Kaemmerer et al. | |
| 5,499,371 A * | 3/1996 | Henninger et al. | 717/108 |
| 5,537,310 A | 7/1996 | Tanake et al. | |
| 5,541,833 A | 7/1996 | Bristol et al. | |
| 5,546,301 A | 8/1996 | Agrawal et al. | |
| 5,559,690 A | 9/1996 | Keeler et al. | |
| 5,561,599 A | 10/1996 | Lu | |
| 5,566,065 A | 10/1996 | Hansen et al. | |
| 5,570,282 A | 10/1996 | Hansen et al. | |
| 5,572,420 A | 11/1996 | Lu | |
| 5,574,638 A | 11/1996 | Lu | |
| 5,596,704 A | 1/1997 | Geddes et al. | |
| 5,640,491 A | 6/1997 | Bhat et al. | |
| 5,666,297 A | 9/1997 | Britt et al. | |
| 5,687,090 A | 11/1997 | Chen et al. | |
| 5,692,158 A | 11/1997 | Degeneff et al. | |
| 5,704,011 A | 12/1997 | Hansen et al. | |
| 5,715,158 A | 2/1998 | Chen | |
| 5,729,661 A | 3/1998 | Keeler et al. | |
| 5,740,324 A | 4/1998 | Mathur et al. | |
| 5,742,513 A | 4/1998 | Bouhenguel et al. | |
| 5,761,518 A | 6/1998 | Boehling et al. | |
| 5,777,872 A | 7/1998 | He | |
| 5,781,432 A | 7/1998 | Keeler et al. | |
| 5,784,569 A * | 7/1998 | Miller et al. | 709/235 |
| 5,790,898 A | 8/1998 | Kishima et al. | |
| 5,796,609 A | 8/1998 | Tao et al. | |
| 5,798,939 A | 8/1998 | Ochoa et al. | |
| 5,809,490 A | 9/1998 | Guiver et al. | |
| 5,819,050 A | 10/1998 | Boehling et al. | |
| 5,819,232 A | 10/1998 | Shipman | |
| 5,825,645 A | 10/1998 | Konar et al. | |
| 5,826,249 A | 10/1998 | Skeirik | |
| 5,842,189 A | 11/1998 | Keeler et al. | |
| 5,847,952 A | 12/1998 | Samad | |
| 5,859,773 A | 1/1999 | Keeler et al. | |
| 5,877,954 A | 3/1999 | Klimasauskas et al. | |
| 5,892,679 A | 4/1999 | He | |
| 5,892,939 A | 4/1999 | Call et al. | |
| 5,898,869 A | 4/1999 | Anderson | |
| 5,901,058 A | 5/1999 | Steinman et al. | |
| 5,905,989 A | 5/1999 | Biggs | |
| 5,907,701 A | 5/1999 | Hanson | |
| 5,909,370 A | 6/1999 | Lynch | |
| 5,909,541 A | 6/1999 | Sampson et al. | |
| 5,909,586 A | 6/1999 | Anderson | |
| 5,917,840 A | 6/1999 | Cheney et al. | |
| 5,918,233 A | 6/1999 | La Chance et al. | |
| 5,924,086 A | 7/1999 | Mathur et al. | |
| 5,940,290 A | 8/1999 | Dixon | |
| 5,948,101 A | 9/1999 | David et al. | |
| 5,949,417 A | 9/1999 | Calder | |
| 5,953,702 A * | 9/1999 | Ohlemacher et al. | 705/1 |
| 5,958,008 A * | 9/1999 | Pogrebisky et al. | 709/223 |
| 5,960,214 A | 9/1999 | Sharpe et al. | |
| 5,960,441 A | 9/1999 | Bland et al. | |
| 5,966,717 A | 10/1999 | Sass | |
| 5,984,502 A | 11/1999 | Calder | |
| 5,988,847 A | 11/1999 | McLaughlin et al. | |
| 6,008,985 A | 12/1999 | Lake et al. | |
| 6,033,257 A | 3/2000 | Lake et al. | |
| 6,041,263 A | 3/2000 | Boston et al. | |
| 6,047,221 A | 4/2000 | Piche et al. | |
| 6,055,483 A | 4/2000 | Lu | |
| 6,067,505 A | 5/2000 | Bonoyer et al. | |
| 6,076,124 A | 6/2000 | Korowitz et al. | |
| 6,078,843 A | 6/2000 | Shavit | |
| 6,093,211 A | 7/2000 | Hamielec et al. | |
| 6,106,785 A | 8/2000 | Havlena et al. | |
| 6,108,616 A | 8/2000 | Borchers et al. | |
| 6,108,657 A * | 8/2000 | Shoup et al. | 707/100 |
| 6,110,214 A | 8/2000 | Klimasauskas | |
| 6,111,615 A * | 8/2000 | Oh et al. | 348/714 |
| 6,112,301 A * | 8/2000 | Johnson | 713/1 |
| 6,122,555 A | 9/2000 | Lu | |
| 6,128,279 A | 10/2000 | O'Neil et al. | |
| 6,202,124 B1 * | 3/2001 | Kern et al. | 711/112 |
| 6,216,131 B1 | 4/2001 | Liu et al. | 707/102 |
| 6,279,015 B1 * | 8/2001 | Fong et al. | 715/523 |
| 6,324,654 B1 * | 11/2001 | Wahl et al. | 714/6 |
| 6,356,901 B1 | 3/2002 | MacLeod et al. | |
| 6,388,183 B1 * | 5/2002 | Leh | 84/645 |
| 6,401,081 B1 * | 6/2002 | Montgomery et al. | 705/63 |
| 6,421,571 B1 | 7/2002 | Spriggs et al. | |
| 6,442,706 B1 * | 8/2002 | Wahl et al. | 714/6 |
| 6,480,096 B1 * | 11/2002 | Gutman et al. | 340/5.31 |
| 6,490,493 B1 * | 12/2002 | Dharnipragada | 700/97 |
| 6,549,890 B1 * | 4/2003 | Mundell et al. | 705/10 |
| 6,581,069 B1 * | 6/2003 | Robinson et al. | 707/104.1 |
| 6,611,519 B1 * | 8/2003 | Howe | 370/386 |
| 6,611,817 B1 * | 8/2003 | Dorrance et al. | 705/39 |
| 6,618,818 B1 * | 9/2003 | Wahl et al. | 714/6 |
| 6,633,324 B1 * | 10/2003 | Stephens, Jr. | 348/14.09 |
| 6,687,036 B1 * | 2/2004 | Riza | 359/204 |
| 6,694,380 B1 * | 2/2004 | Wolrich et al. | 710/5 |
| 6,834,287 B1 * | 12/2004 | Folk-Williams et al. | 707/103 Z |
| 6,868,451 B1 * | 3/2005 | Peacock | 709/231 |
| 6,920,330 B1 * | 7/2005 | Caronni et al. | 455/456.1 |
| 6,957,158 B1 * | 10/2005 | Hancock et al. | 702/61 |
| 7,023,465 B1 * | 4/2006 | Stephens, Jr. | 348/14.09 |
| 7,038,973 B1 * | 5/2006 | Merlino | 368/2 |
| 2005/0002523 A1 * | 1/2005 | Sonnekalb | 380/28 |

FOREIGN PATENT DOCUMENTS

| | | |
|---|---|---|
| WO | WO 99/13426 | 3/1999 |
| WO | WO 01/06418 A1 | 1/2001 |
| WO | WO 02/47463 A2 | 6/2002 |

* cited by examiner

METHODS AND APPARATUS FOR IMPORTING DEVICE DATA INTO A DATABASE SYSTEM USED IN A PROCESS PLANT

TECHNICAL FIELD

The present patent relates generally to process control systems, and more particularly, to database systems used in process plants.

BACKGROUND ART

Process plants, like those used in chemical, petroleum or other processes, typically include one or more centralized or decentralized process controllers communicatively coupled to at least one host or operator workstation and to one or more process control and instrumentation devices, such as field devices, via analog, digital or combined analog/digital buses. Field devices, which may be, for example valves, valve positioners, switches, transmitters, and sensors (e.g., temperature, pressure and flow rate sensors), perform functions within the process such as opening or closing valves and measuring process parameters. While a typical process plant has many process control and instrumentation devices, such as valves, transmitters, sensors, etc. connected to one or more process controllers which execute software that controls these devices during the operation of the process, there are many other supporting devices which are also necessary for or related to process operation. These additional devices include, for example, power supply equipment, power generation and distribution equipment, rotating equipment such as turbines, etc., which are located at numerous places in a typical plant. While this additional equipment does not necessarily create or use process variables and, in many instances, is not controlled or even coupled to a process controller for the purpose of affecting the process operation, this equipment is nevertheless important to and ultimately necessary for proper operation of the process. In the past however, process controllers were not necessarily aware of these other devices or the process controllers simply assumed that these devices were operating properly when performing process control.

Still further, many process plants have other computers associated therewith which execute applications related to business functions or maintenance functions. For example, some plants include computers which execute applications associated with ordering raw materials, replacement parts or devices for the plant, applications related to forecasting sales and production needs, etc. Likewise, many process plants, and especially those which use smart field devices, use asset management applications which are used to help monitor, track, and maintain the devices within the plant regardless of whether these devices are process control and instrumentation devices or are other types of devices. For example, an Asset Management Solutions (AMS) application sold by Fisher-Rosemount Systems, Inc. enables communication with and stores data pertaining to field devices to ascertain and track the operating state of various field devices. An example of such a system is disclosed in U.S. Pat. No. 5,960,214 entitled "Integrated Communication Network for use in a Field Device Management System."

Maintenance personnel who are primarily responsible for ensuring that the actual equipment within the process is operating efficiently and for repairing and replacing malfunctioning equipment, use tools such as maintenance interfaces, the AMS application discussed above, as well and many other diagnostic tools which provide information about operating states of the devices within the process. To maintain information about various field devices in a process control system, such an AMS application maintains a database of information about a number of devices. Generally, various devices used in a process control system can be expected to be manufactured by a number of different manufacturers. It is quite likely that not all the devices communicate with each other or the process control devices in the same manner. To overcome the problem of incompatibility among devices manufactured by different manufacturers, the process instrumentation industry uses a standardized digital device communications protocol as defined by a foundation such as the HART Foundation, or Fieldbus Foundation in order to allow a single application to communicate with multiple device types. Typically, these foundations will have a standard that defines how each device identifies itself to a process control system using a standard communication protocol and a device description (DD). Each device type would typically have its own DD. Typically a DD contains a number of parameters identifying a device, such as a name of a manufacturer of the device, a serial number of a device, a revision number of a device, etc. The DD, typically, would also contain definitions for accessible variables, commands and operating procedures.

It is quite possible that each device type used in a process plant may support a different set of parameters in order for it to perform its function. Alternatively, some devices may use a different name or structure for the same parameter. For example, one of the parameters describing a device may be a manufature_ID, which provides information about an ID number associated with a manufacturer of a device. The AMS application may accept only numeric characters for a manufacture_ID. On the other hand another device may provide the same information about a manufacturer of a device using a parameter named manufacture_identification, where this parameter will accept any alphanumeric characters.

When the AMS application is implemented in a process plant that uses such a device, the maintenance personal may want to import existing data about their instrumentation into AMS. This existing information may be from a $3^{rd}$ Party application such as the device manufacturer, another asset management system, engineering design system, etc. Typically, the existing data can be exported out of these $3^{rd}$ Party systems to a generic textfile. When such a generic text file provides a device identifying information using a data structure different from a data structure expected by AMS database, either the generic text file or the data from the generic text file has to be modified before such data is imported into the AMS database to ensure that its data structure complies with the data structure accepted by the AMS.

Another problem associated with importing device information into an AMS database is a use of enumerations to define various parameters describing a device. For example, in the AMS a parameter named pressure_output_transport_function, which is used to describe pressure output transport function of certain type of device, may contain only a value of 0 or 1, where 0 represents a linear function and 1 represents a square root function. On the other hand, a generic text file describing the same type of device from a $3^{rd}$ Party may define the same characteristic of the device by a parameter named output_pressure_transport_function, which may contain only a value of L or S, where L represents a linear function and S represents a square root function. When importing data from such a generic text file into the AMS application, it is necessary that all instances of L are converted to 0 and all instances of S are converted to 1.

Various manual data mapping methods are used currently which may involve using a spreadsheet or similar tool or custom programming to map import parameters related to a device from one format to another in order to allow the importing of the data into an asset management database. Manual methods are extremely time consuming and less reliable in terms of consistency of the data when importing said data. While custom programming can be done to automate the steps and improve the reliability of the data, this requires the development of a custom application to do the work each time and someone still needs to document how the mapping is to be done.

BRIEF DESCRIPTION OF THE DRAWINGS

The present patent is illustrated by way of example and not limitation in the accompanying figures, in which like references indicate similar elements, and in which.

DESCRIPTION OF THE EMBODIMENTS

Figure 1:
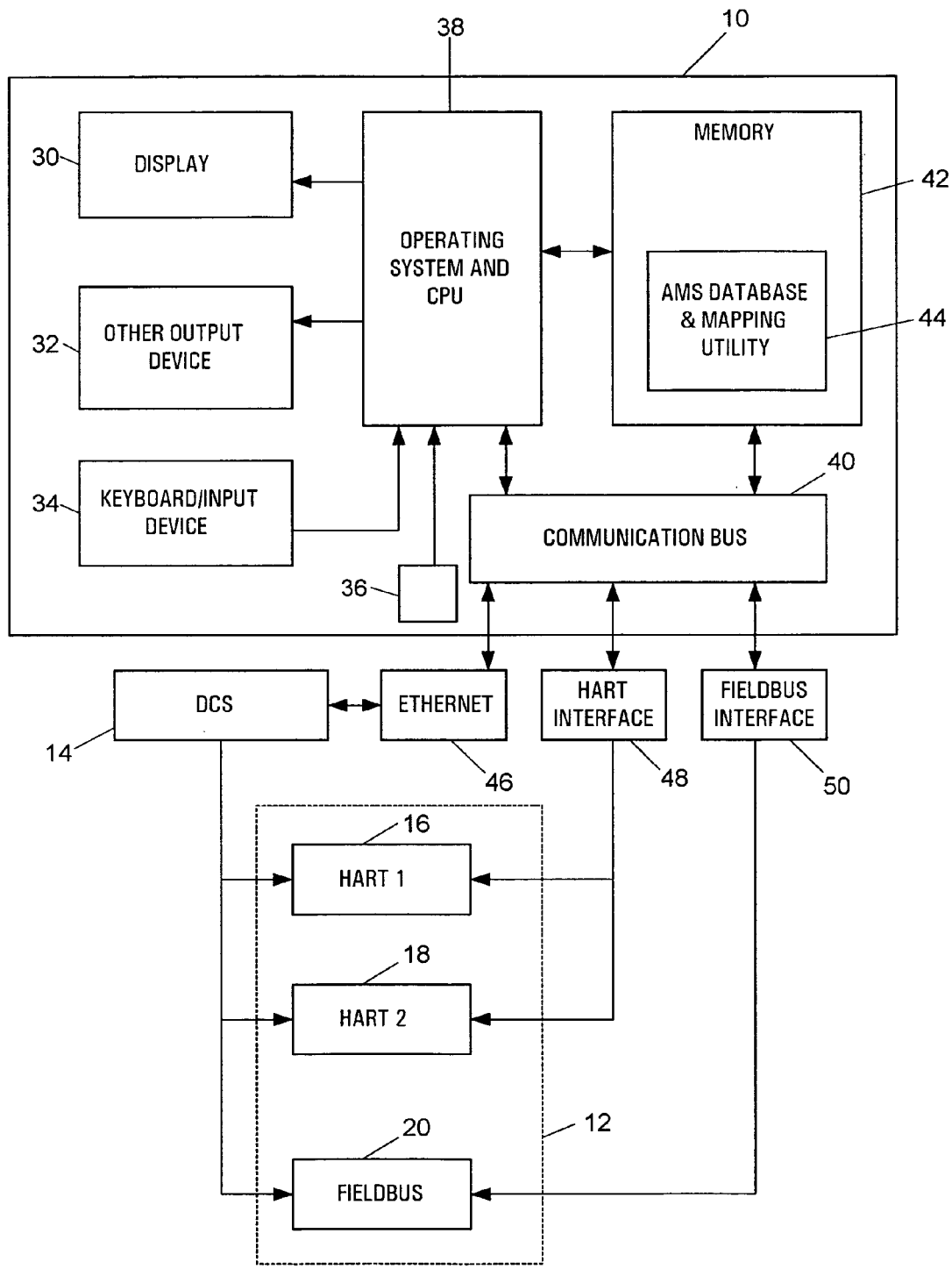
FIG. 1 is an exemplary illustration of an AMS application used in a process plant.

FIG. 1 is an exemplary illustration of an asset management system 10 (AMS), interconnected with a process 12, and a distributed control system 14 (DCS) that controls the process 12. The process 12 may comprise any desired type of process, such as a manufacturing process, a refinery process, etc., and is illustrated as including three process devices, including two HART devices 16, 18 and one fieldbus device 20. The devices 16, 18 and 20 are controlled in any manner by the DCS 14.

Generally the AMS 10 is a computer based tool that includes applications that maintain information about various field devices. The AMS 10 collects and maintains information about various devices within the process 12. The AMS system 10 may include a display 30, any other output device such as a printer, etc. 32, a keyboard or other input device 34, a mouse 36, an operating system and a CPU 38, a communication bus 40, and a memory 42 containing an AMS database and mapping utility 44. The memory 42 may be any type of memory including random access memory (RAM), read-only memory (ROM) or external memory in the form of a disk drive, tape drive, etc., or a combination of some of the above. In the AMS 10, an AMS database contained in the AMS database and mapping utility 44 stores data about various devices in a format that is based on a device foundation standard. The AMS database and mapping utility 44 is described in further detail in FIG. 2.

The DCS 14 is connected to the AMS 10 by an Ethernet communication system 46. The HART devices 16, 18 are connected to the AMS by a HART interface 48. In the AMS 10, a manufacturer of the HART devices 16, 18 provides device description files that comply with the device foundation standard. Accordingly, the device description files for the HART devices 16, 18 contain information describing these devices in a format similar to a format used by the AMS database and mapping utility 44 to store device data. The fieldbus device 20 is connected to the AMS by a fieldbus interface 50. In the AMS 10, a manufacturer of the fieldbus device 20 provides device description files that does not comply with the device foundation standard. Accordingly, the device description files for the fieldbus device 20 contain information describing this device in a format different than the format used by the AMS database and mapping utility 44 to store device data.

Figure 2:
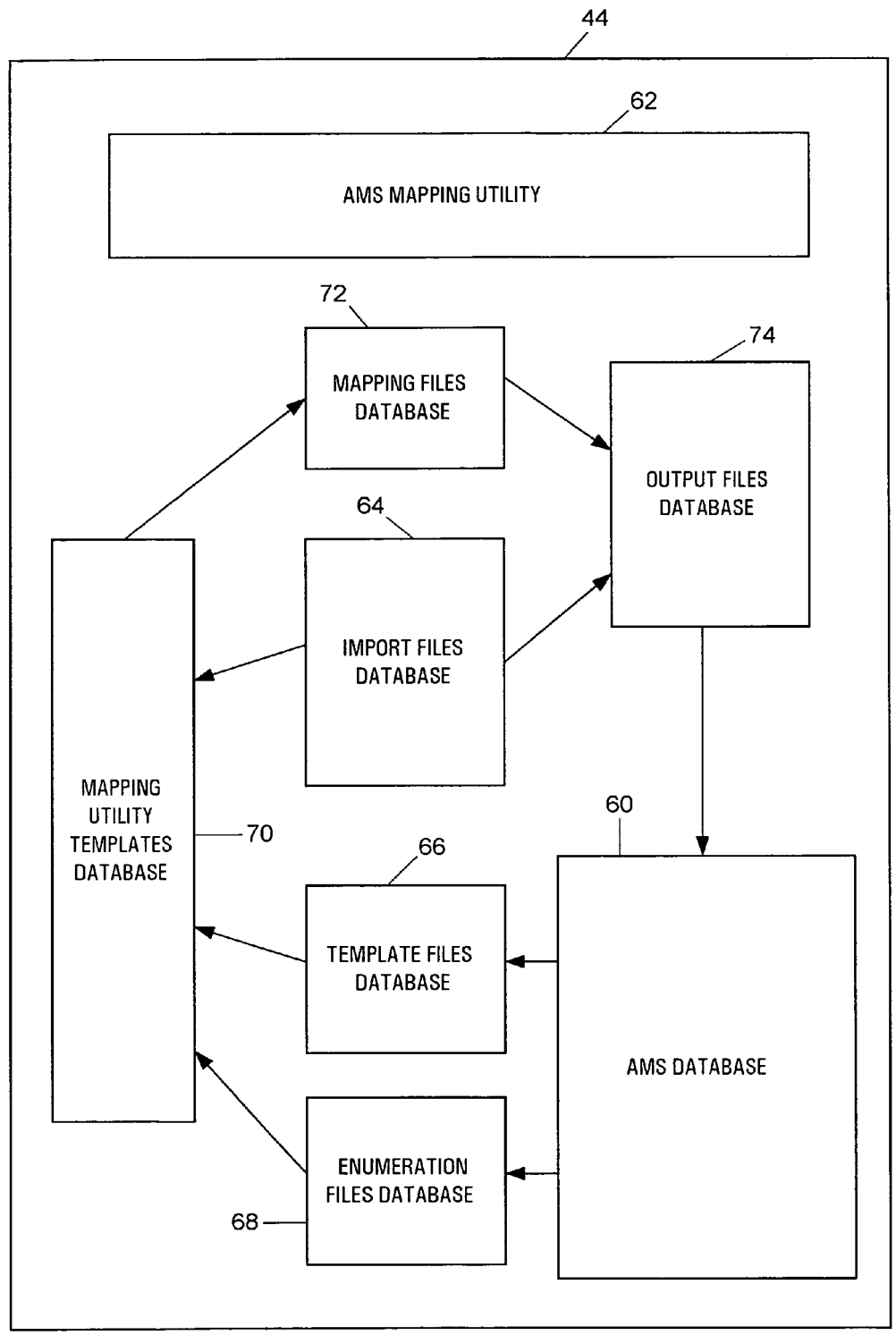
FIG. 2 is an exemplary illustration of an AMS database and a mapping utility.

FIG. 2 is an exemplary illustration of the AMS database and mapping utility 44, including an AMS database 60, an AMS mapping utility 62, an import files database 64, a template files database 66, an enumeration files database 68, a mapping utility templates database 70, a mapping files database 72, and an output files database 74. The AMS database 60 can be designed using one of a number of popular databases available in the industry, such as an Oracle database, an SQL database, etc. The AMS database 60 contains a number of records, where each record contains information about a device in a number of fields, where each field contains a value corresponding to a parameter describing that device according to the device description format recommended by the device foundation standard. The AMS mapping utility 62 allows a mapping of various parameters from various import files contained in the import files database 64 to various parameters used to describe devices in the AMS database 60. The import files contained in the import files database 64 may be provided by various device manufacturers or other third party applications. In the exemplary illustration of the AMS database and mapping utility 44, the AMS mapping utility 62 is implemented using a software designed in any of the popular programming languages and stored in the memory 42. However, in an alternate implementation of the AMS database and mapping utility 44, the AMS mapping utility 62 may be implemented as firmware, hardware, etc. The AMS mapping utility 62 implemented using software stored in the memory 42 is further described in detail in FIG. 3.

The import files database 64 includes various generic text files provided by various manufacturers or third parties, where each of the generic text files contains a number of records regarding a number of devices of a given device type. For example, the import files database 64 may contain a file named file_1, provided by Rosemount, Inc. that contains information about 50 devices of the Rosemount 1151 revision 1 type of devices. Such a file may contain 50 records, each of these records containing a number of values corresponding to a number of parameters that describe a Rosemount 1151 revision 1 type of device. Additionally, file_1 may also contain other information regarding the Rosemount 1151 revision 1 type of device such as access variables, operating procedures and commands related to Rosemount 1151 revision 1 type of device. If Rosemount, Inc. provides these records in a format complying with the AMS standard format, the parameters of each record in file_1 will be similar to the parameters used in the AMS database 60 to describe a Rosemount 1151 revision 1 type of device. In this case, the AMS mapping utility 62 can import the records from the File_1 without mapping various parameters from File_1 to various parameters used to describe device records in the AMS database 60.

Alternatively, the import files database 64 may contain a file named File_2, provided by ABC Control that contains information about 50 devices of the XYZ Device 301 revision 2 type of devices. Such a file may contain 50 records, each of these records containing a number of values corresponding to a number of parameters that describe an XYZ Device 301 revision 2 type of device. If ABC Control does not provide these records in a format complying with the AMS standard format, some of the parameters of each record in file_2 will not be similar to the parameters used in AMS database 60 to describe an XYZ Device 301 revision 2 type of device. In this case the AMS mapping utility 62 cannot import data from the File_2 into the AMS database 60 without creating a mapping of various parameters describing device record in the File_2 to various parameters describing device records in the AMS database 60 for XYZ Device 301 revision 2 type of devices.

To address such situation, the AMS mapping utility 62 uses a template file related to the XYZ Device 301 revision 2 type of device, which is stored in the template files database 66 and an enumeration file related to the XYZ Device 301 revision 2 type of device, which is stored in the enumeration files database 68. A template file for a given type of device is generated by AMS 10 based on the data structure used by the AMS database 60 to store a list of parameters related to that type of device. A template file may contain a list of parameters describing a type of device in the AMS database 60, and various other information describing each of such parameters, such as the type of data that can be used to describe a parameter (such as alpha, numeric, date, time, etc.), a range of values acceptable for that parameter (such as 1–255, A–K, etc.). An enumeration file may contain a list of parameters describing a device in the AMS database 60, and various enumerated parameter values related to a parameter and a user understandable string explaining each of the enumerated parameter values. (For example, an enumeration file for a Rosemount 3051C revision 2 type of device may contain values of 0 and 1 for a parameter named burse_mode_select and "off" and "on" as the strings explaining the values of 0 and 1).

To create a mapping of various parameters from the export file generated by a $3^{rd}$ party application such as File_2 to various parameters in the AMS database 60, the AMS mapping utility 62 uses a number of mapping utility templates from the mapping utility templates database 70. The mapping utility templates stored in the mapping utility database 70 may be presented in the form of graphical user interface (GUI) mapping templates used by various operating systems. Each of such GUI mapping templates may include one or more software routines that are implemented in any suitable programming languages. It should be noted that the software routines making up various GUI mapping templates may be processed on the operating system and CPU 38 of the AMS 10 or alternatively, can be processed on any other workstation, computer, etc., that may be connected to the AMS 10 by the Ethernet 46 or any other communication network. Such GUI mapping templates are shown on the display 30, which may be a computer monitor, and they receive inputs from a user by either the keyboard 34, the mouse 36, or any other data input device attached to the AMS 10. While in the present implementation, the mapping utility database 70 is used to store a number of GUI mapping templates, in an alternate embodiment, such GUI mapping templates can be generated by a GUI engine that is well known to a person of ordinary skill in the art. If such an GUI engine is used, the GUI templates will be created on the fly, that is as necessary.

Preferably, but not necessarily, the GUI mapping templates may be implemented using a familiar graphical windows-based structure and appearance, in which a plurality of interlinked graphical views or pages include one or more pull-down menus that enable a user to navigate through the pages in a desired manner to view and/or retrieve a particular type of information. The features and/or capabilities of the AMS 10 may be represented, accessed, invoked, etc., through one or more corresponding pages, views or displays of the GUI mapping templates. Furthermore, the various displays making up the GUI mapping templates may be interlinked in a logical manner to facilitate a user's quick and intuitive navigation through the displays to invoke particular functions of the AMS 10. Some of the various GUI mapping templates included in the mapping templates database 70, and various software routines attached to them are discussed in further detail in FIGS. 4–23.

Using the various GUI mapping templates from the GUI mapping templates database 70, and various inputs provided by a user to some of these GUI mapping templates, the AMS mapping utility 62 documents the data mapping in a mapping file for a device type such as, for example ABC Control 3051 Revision 2 type of device. Such a mapping file created by the AMS mapping utility 62 maps each of the various parameters from various import files contained in the import files database 64 to various parameters in the AMS database 60. Such a mapping file can be stored in the mapping files database 72.

Once a mapping file for a device type is created, a user can elect to create an output file that contains the data from a given import file converted into a data structure and format that can be merged into the AMS database 60. Such output files can be stored in the output files database 74. Since the mapping files can be stored in the mapping files database 72 on a permanent basis, a user can use such mapping files at any time in the future to create out files.

Figure 3:
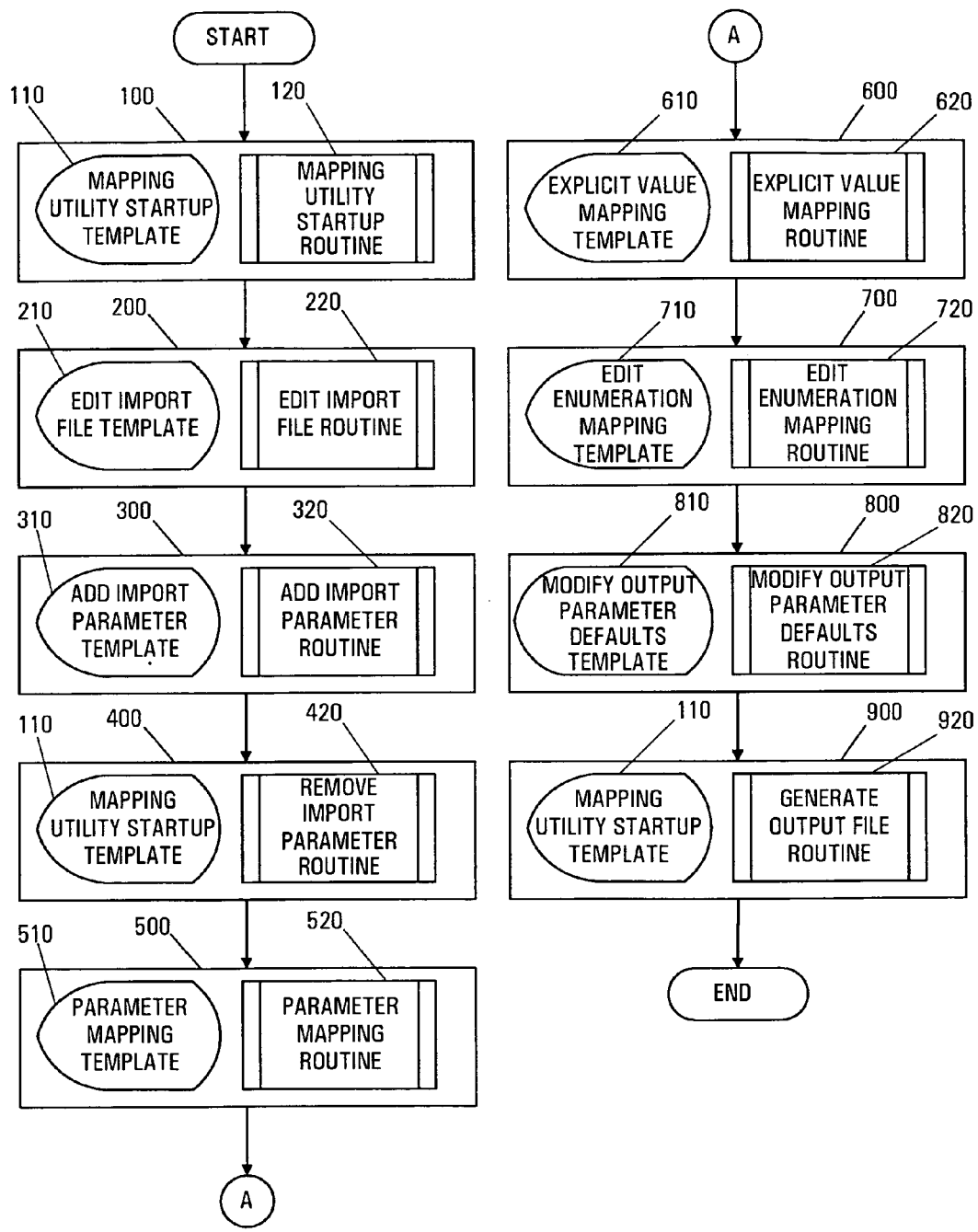
FIG. 3 is an exemplary illustration of a flowchart illustrating an example AMS mapping utility program.

FIG. 3 is an exemplary illustration of a flowchart 64 illustrating the AMS mapping utility 62 implemented using a software program. Because the exemplary AMS mapping utility 62 performs the mapping process using a number of mapping utility templates from the mapping utility templates database 70, the AMS mapping utility 62 is exemplified in FIG. 3 using a number of templates. Although the AMS mapping utility 62 is described with reference to the flowchart 64, a person of ordinary skill in the art will readily appreciate that many other methods of performing the acts associated with the AMS mapping utility 62 may be used. For example, the order of many of the templates shown in FIG. 3 may be changed, and some of the templates described in here may be removed from the flowchart without affecting the performance of the other templates within the AMS mapping utility 62. Similarly, it should be clear to one of ordinary skill in the art that a user may use only some of the templates described in FIG. 3. Each of the various templates described in FIG. 3 may have a software routine attached to it. The GUI mapping templates described in FIG. 3 and various software routines attached to each of these templates are discussed in further detail in FIGS. 4–23.

Referring to FIG. 3, at block 100, the AMS mapping utility 62 presents a mapping utility template 110 to a user asking whether the user wants to start the AMS mapping utility to map various parameters from an import file from the import file database 64 to the parameters used in the AMS database 60. The mapping utility template 110 is discussed in further detail in FIG. 4. The mapping utility template 110 has a mapping utility routine 120 attached to it, which is discussed in further detail in FIG. 5.

At block 200, the AMS mapping utility 62 presents an edit import file template 210 to a user asking whether the user wants to edit an import file from the import file database 64. The edit import file template 210 is discussed in further detail in FIG. 6. The edit import file template 210 has an edit import file routine 220 attached to it, which is discussed in further detail in FIG. 7.

At block 300, the AMS mapping utility 62 presents an add import parameter template 310 to a user asking whether the user wants to add an import parameter to an import file from the import file database 64. The add import parameter template 310 is discussed in further detail in FIG. 8. The add import parameter template 310 has an add import parameter routine 320 attached to it, which is discussed in further detail in FIG. 9.

At block 400, the AMS mapping utility 62 presents a remove import parameter template 410 to a user asking whether the user wants to remove an import parameter from an import file from the import file database 64. The remove import parameter template 410 is discussed in further detail in FIG. 10. The remove import parameter template 410 has a remove import parameter routine 420 attached to it, which is discussed in further detail in FIG. 11.

At block 500, the AMS mapping utility 62 presents a parameter mapping template 510 to a user asking whether the user wants to map in import parameter to an output parameter used by the AMS database 60. The parameters mapping template 510 is discussed in further detail in FIG. 12. The parameters mapping template 510 has a parameter mapping routine 520 attached to it, which is discussed in further detail in FIG. 13.

At block 600, the AMS mapping utility 62 presents an explicit value mapping template 610 to a user asking whether the user wants to map an explicit value to an output parameter in the AMS database 60. The explicit value mapping template 610 is discussed in further detail in FIG. 14. The explicit value mapping template 610 has an explicit value mapping routine 620 attached to it, which is discussed in further detail in FIG. 15.

At block 700, the AMS mapping utility 62 presents an edit enumeration mapping template 710 to a user asking whether the user wants to edit an enumeration mapping between an import parameter in an import file from the import file database 64 and an output parameter in the AMS database 60. The edit enumeration mapping template 710 is discussed in further detail in FIG. 16. The edit enumeration mapping template 710 has an edit enumeration mapping routine 720 attached to it, which is discussed in further detail in FIG. 17.

At block 800, the AMS mapping utility 62 presents a modify output parameter defaults template 810 to a user asking whether the user wants to modify defaults related to an output parameter in the AMS database 64. The modify output parameter defaults template 810 is discussed in further detail in FIG. 18. The modify output parameter defaults template 810 has a modify output parameter defaults routine 820 attached to it, which is discussed in further detail in FIG. 19.

At block 900, the AMS mapping utility 62 presents a generate output file template 910 to a user asking whether the user wants to generate an output file that can be merged into the AMS database 60. The generate output file template 910 is discussed in further detail in FIG. 20. The generate output file template 910 has a generate output file routine 920 attached to it, which is discussed in further detail in FIG. 21.

Figure 4:
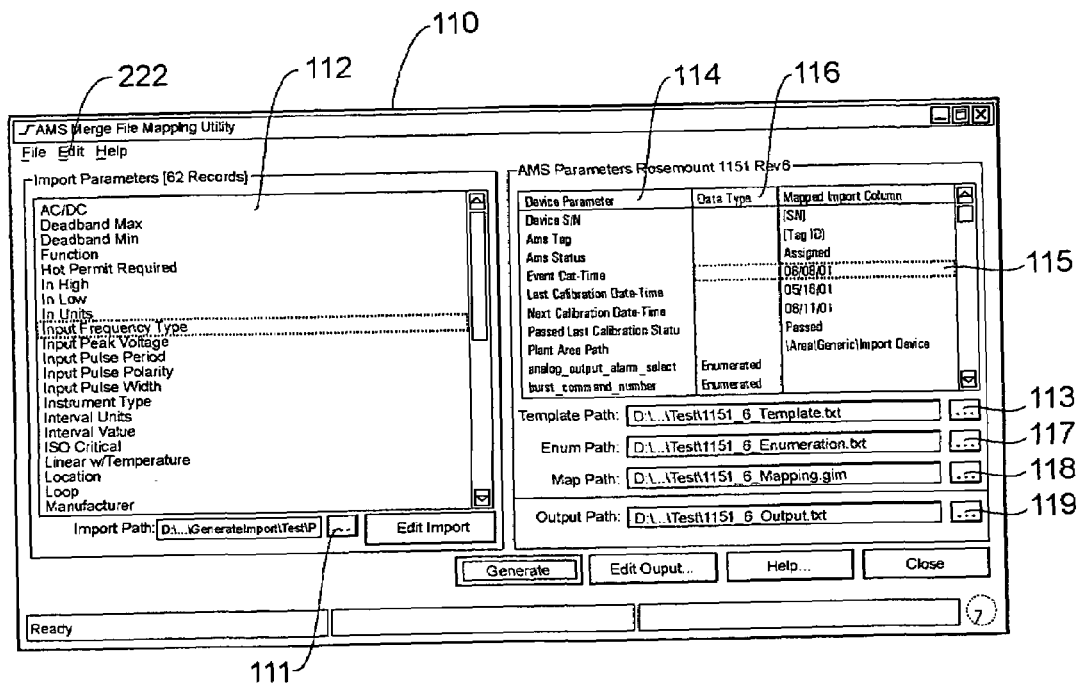
FIG. 4 is an exemplary illustration of a mapping utility template.

FIG. 4 is an exemplary mapping utility template 110 that may be presented to a user to start execution of the AMS import utility 62. In a windows based implementation of the AMS 10, a user can invoke such a mapping utility template 110 by clicking on an icon on the monitor 30 of the AMS 10 by a mouse 36. The exemplary version of the mapping utility template 110 presents a number of choices to a user to select various files necessary for a mapping process to be performed by the AMS import utility 62. By selecting a button 111, a user can specify a path of an import file to be used by the AMS import utility 62. Such an import file may be stored in the import file database 64, and may contain a number of records describing a specific type of devices, for example such an import file may contain a number of records describing Rosemount 1151 Rev. 6 type of devices. A number of import parameters specifying a type of device in the import file specified by the user are displayed in a first window 112 of the mapping process startup template 110. In the exemplary mapping process startup template 10 shown in FIG. 4, the first window 112 shows a list of parameters describing Rosemount 1151 Rev. 6 type of devices, such as AC/DC, Deadband Mix, etc., which describe this type of devices in an import file specified by a user.

By selecting a button 113, a user can specify a path of a template file containing a list of output parameters describing a device type in the AMS database 60, and various information describing each of such output parameters, such as the type of data that can be used as a value for a parameter (such as alpha, numeric, date, time, enumerated, etc.), a range of values acceptable for that parameter (such as 1–255, A–K, etc.). In FIG. 4, a number of output parameters describing a device type in the AMS database 60 are displayed in a first column 114 in a second window 115 of the mapping process startup template 110, a second column 116 in the second window 115 displays various types of data for some of the parameters listed in the first column 114. In the exemplary mapping process startup template 110 shown in FIG. 4, the first column 114 shows a list of parameters describing Rosemount 1151 Rev. 6 type of devices, such as Device S/N, AMS Tag, etc., which describe this type of devices in the AMS database 60. The second column 116 shows that, for example, for a parameter named analog_output_alarm_select, the AMS database 60 accepts an enumerated list of values.

By selecting a button 117 a user can specify a path for an enumeration file containing a list of enumerations for various parameters for a device type in the AMS database 60. Such an enumeration file may be stored in the enumerations files database 68. An enumeration file may contain a list of parameters describing a device in the AMS database 60, and various enumerated parameter values related to a parameter and a user understandable string explaining each of the enumerated parameter values. For example, in the exemplary mapping process startup template 110 shown in FIG. 4, an enumeration file specified by a user for Rosemount 1151 Rev. 6 type of devices may contain a list of parameters and enumerations in which a parameter of analog_output_alarm_select may contain an enumeration list that include values of 0 and 1, and explanations specifying that 0 means a status of Hi and 1 means a status of Lo.

By selecting a button 118, a user may specify a path where a mapping file generated by the AMS mapping utility 62 is to be saved. Similarly, by selecting a button 119, a user may specify a path where an output file generated by the AMS mapping utility 62 is to be saved.

Figure 5:
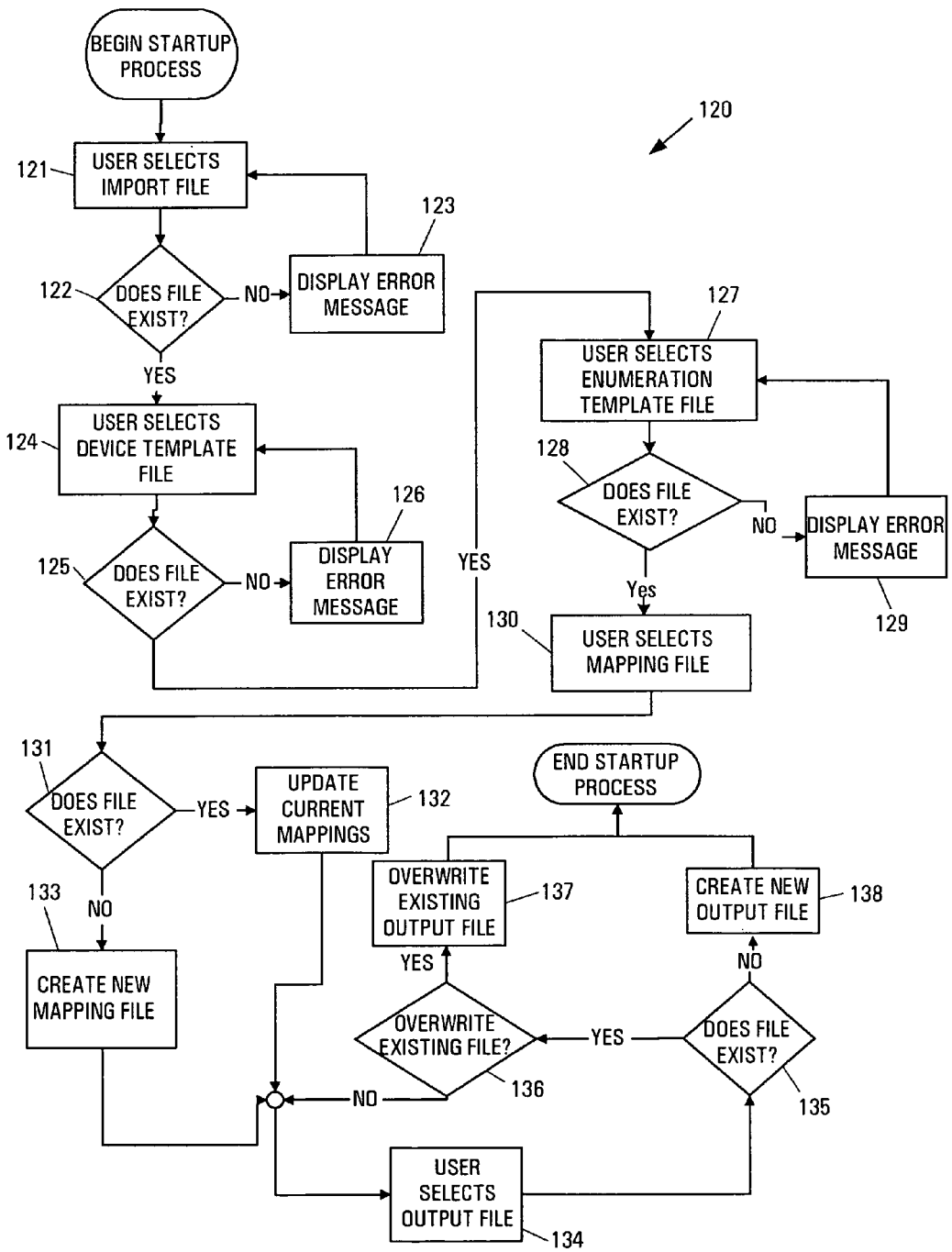
FIG. 5 is an exemplary illustration of a mapping utility routine.

FIG. 5 is an exemplary illustration of a flowchart illustrating a mapping utility routine 120 attached to the mapping utility template 110. At block 121, a user selects an import file by selecting the button 111 on the mapping utility template 110 and specifying a path to the import file. At block 122, the mapping process startup routine 120 tries to find the import file at the path specified by the user. If the mapping process startup routine 120 cannot find the import file at the path specified by the user, at block 123 it displays an error message and asks the user to select a different import file by specifying a new path. At block 124 a user selects a template file by selecting the button 113 on the mapping utility template 110 and specifying a path to the template file. At block 125, the mapping process startup routine 120 tries to find the template file at the path specified by the user. If the mapping process startup routine 120 cannot find the template file at the path specified by the user, at block 126 it displays an error message and asks the user to select a different template file by specifying a new path. At block 127 a user selects an enumeration file by selecting the button 117 on the mapping utility template 110 and specifying a path to the enumeration file. At block 128, the mapping process startup routine 120 tries to find the enumeration file at the path specified by the user. If the mapping process startup routine 120 cannot find the enumeration file at the path specified by the user, at block 129 it displays an error message and asks the user to select a different enumeration file by specifying a new path.

At block 130 a user selects a mapping file by selecting the button 118 on the mapping utility template 110 and specifying a path where an existing mapping file is to be found or where a newly created mapping file is to be saved. At block 131, the mapping process startup routine 120 tries to find a mapping file at the path specified by the user. If the mapping process startup routine 120 can find a mapping file at the path specified by the user, at block 132 it overwrites such a mapping file. If the mapping process startup routine 120 cannot find a mapping file at the path specified by the user, at block 133 it creates a new mapping file and saves it at the path specified by the user. At block 134 a user selects an output file by selecting the button 119 on the mapping utility template 110 and specifying a path where an existing output file can be found or where a newly created output file is to be saved. At block 135, the mapping process startup routine 120 tries to find an output file at the path specified by the user. If the mapping process startup routine 120 can find the output file at the path specified by the user, at block 136 it asks the user if such an output file should be overwritten. If the user selects not to overwrite the output file, the mapping utility routine 120 asks the user to provide a new path where an output file should be saved. If the user selects to overwrite the output file found at the path specified by the user, at block 137, the mapping process startup routine 120 overwrites such an output file. If no output file exists at the path specified by the user, at block 138 the mapping process startup routine 120 creates a new output file.

Figure 6:
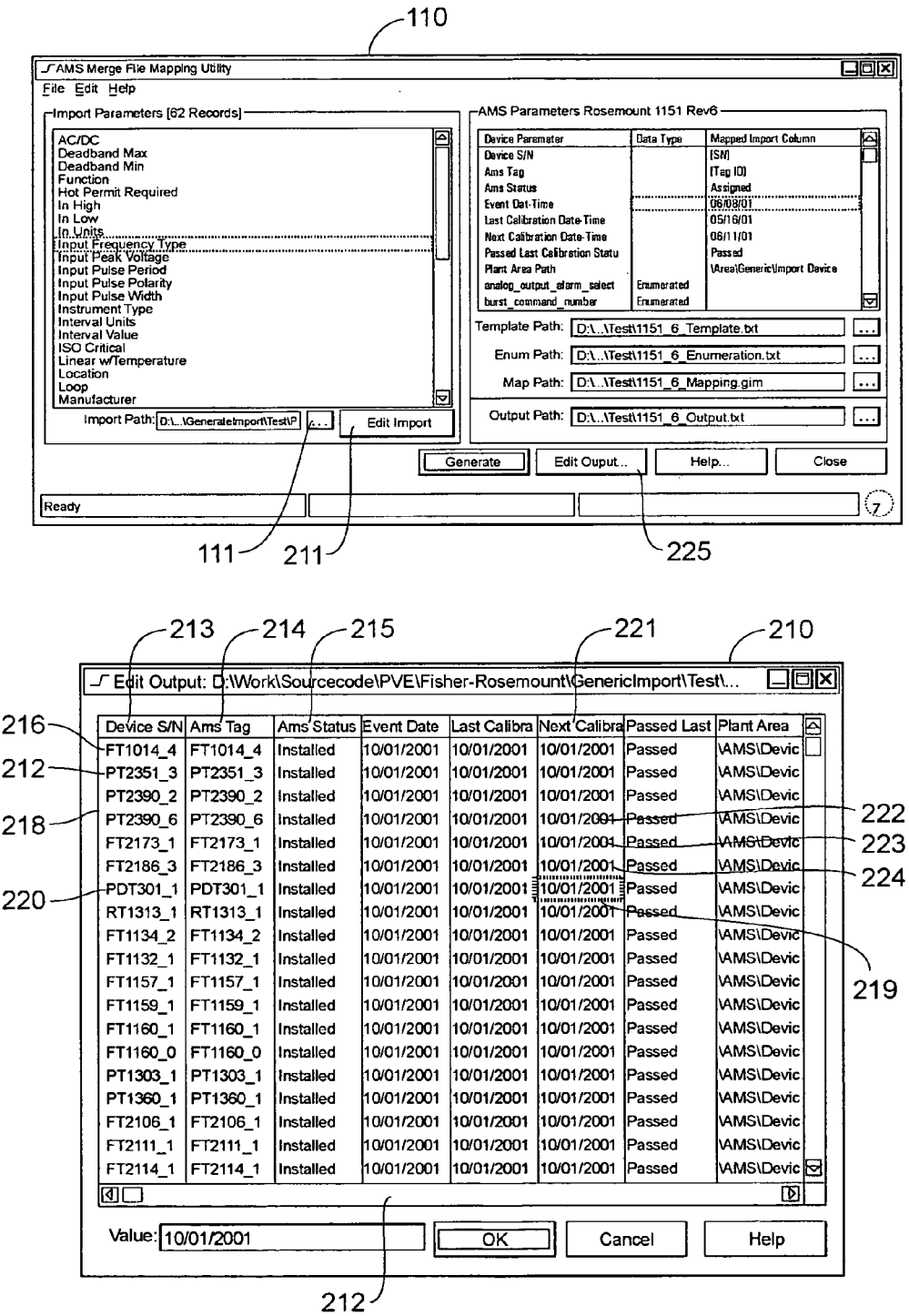
FIG. 6 is an exemplary illustration of an edit import file template.

FIG. 6 shows an exemplary edit import file template 210 that may be displayed by the AMS mapping utility 62 to allow a user to edit a first import file, where the path of such a first import file can be specified in the mapping utility template 110 by selecting the button 111. A user can invoke the edit import file template 210 by selecting the edit import button 211 on the mapping process startup template 110 as shown in FIG. 6. The edit import file template 210 lists a number of records in a window 212 from the first import file. The window 212 has a number of columns 213, 214, 215, etc., where each column contains a name of a parameter from the first import file as a heading. The window 212 also contains a number of rows 216, 217, 218, etc., where each row has a number of cells containing a number of values corresponding to various parameters for a record from the first import file. For example the window 212 shown in FIG. 6 shows a Device S/N as a heading for the column 213, and a number of values representing a value of the parameter Device S/N in each of the rows 216, 217, 218. A user can select a cell in window 212 to edit the value of such a cell. For example, in FIG. 6, a cell 219 in a row 220 and a column 221, representing a next calibration date parameter has been selected by a user. There are a number of ways a user can change the content of the cell 219. One way to edit the content of the cell 219 is to type in the desired new value by using the keyboard 34 of the AMS 10.

Another way to edit the content of a cell is to select a range of cells in a column and select a fill down menu item from a context menu that can be activated by clicking on a right mouse button on the mouse 36 of the AMS 10, which results in a value from a topmost cell of the range of cells to be copied into each of the remaining cells in the range of cells. For example, a user can highlight cells 222, 223, 224 and 219 in the column 221 and select the fill down menu item from the context menu, to copy the content of cell 222 into each of the cells 223, 224 and 219.

Yet another way of editing a value of the cell 219 may be to select the cells 222, 223, 224 and 219 in the column 221 and to select an increment down menu item from the context menu, which results in a first incremental value to be copied into the cell 223, where the first incremental value is a equal to the value of the topmost selected cell 222 incremented by one, a second incremental value to be copied into the cell 224, where the second incremental value is equal to the first incremental value incremented by one, and a third incremental value to be copied into the cell 219, where the third incremental value is a result of the second incremental value incremented by one.

Yet another way of editing a value of the cell 219 may be to select the cell 219 and to select an insert today's date menu item from the context menu, which results in the date on which such an edit is performed to be entered into the cell 219. Although, only a few methods of editing a value of the cell 219 are discussed here, a person of ordinary skill in the art will appreciate that alternate methods of editing a value of the cell 219 may be provided. Similarly, even though various alternate ways of editing a value of a cell are discussed here in a context of the cell 219, it can be appreciated that these alternate ways can be used to make changes to values of any of the other cells in the window 212.

Please note that the edit import file template 210 is used to edit an import file, where an import file to be edited is specified by selecting the edit import button 211, a user can also edit an output file using the same template if an output file is selected by selecting the edit output file button 225.

Figure 7:
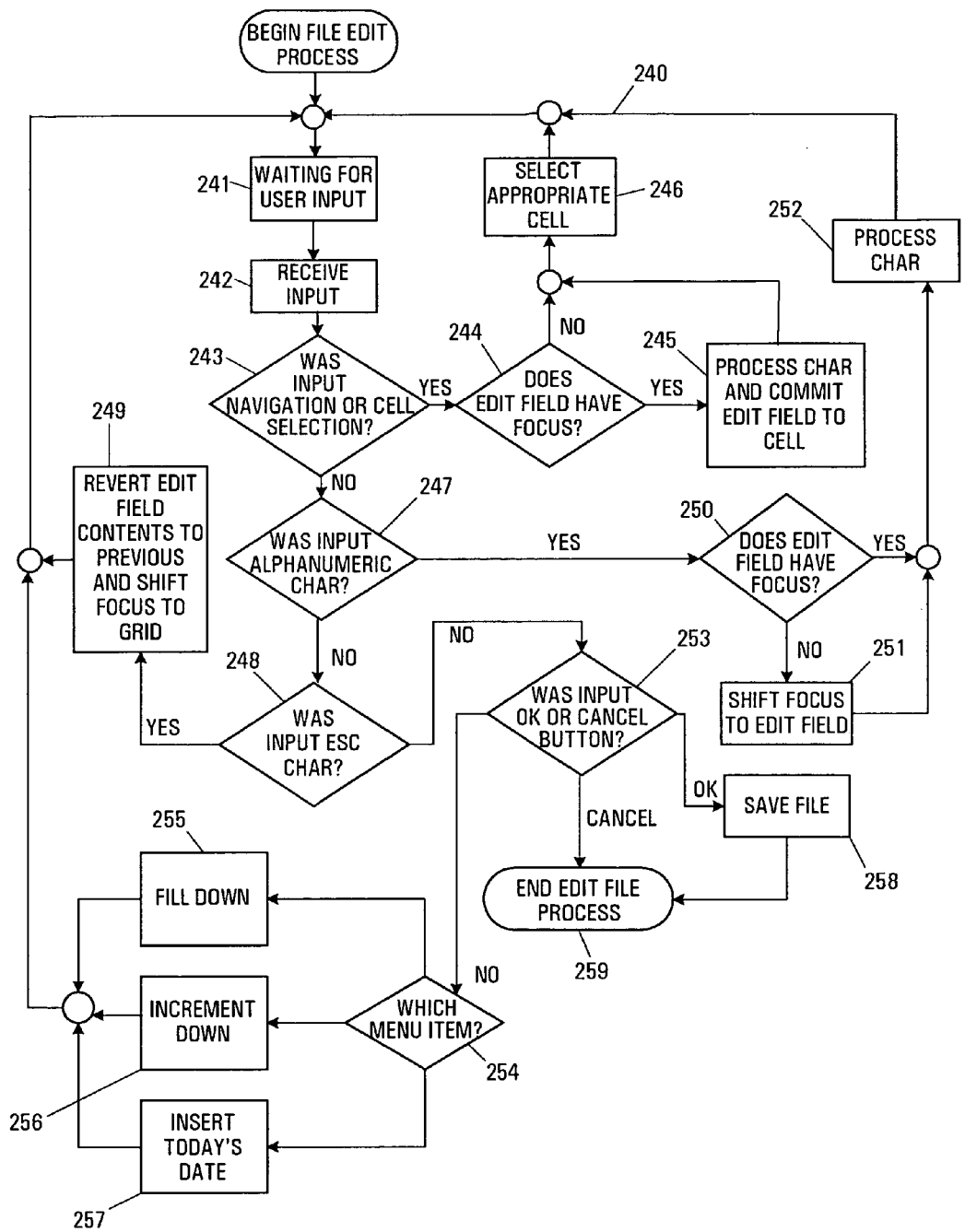
FIG. 7 is an exemplary illustration of an edit import file routine.

FIG. 7 is an exemplary illustration of a flowchart illustrating an edit import file routine 240 attached to the edit import file template 210. A user can activate this routine by selecting the button 211 of the mapping utility startup template, which results in the records from the first import file being shown in window 212. At block 241, the edit import file routine 240 presents the edit import file template 210 to a user and waits for an input from the user. At this point the edit import file routine 240 has a focus on the window 212 of the edit import file template 210.

In a graphical user interface (GUI) such as the one used by the AMS mapping utility 62, a focus on either a window or another object used by the GUI indicates that a next user action, such as input, etc., is directed to the object that has a focus at the time of such a user action. When a user selects a particular cell within the window 212, a focus will shift to the selected cell. A user can shift focus to a cell in a number of different ways, including, by using a navigation key, such as right-arrow, left-arrow, etc. When a user starts editing a value in a cell, the edit import file routine 240 creates an edit field and shifts the focus to the edit field. Such an edit field generally stores the value contained in the cell with any edit that a user may have made to it, and can be stored in a RAM in the AMS 60.

At block 242, a user provides a first input which can be in the form of a navigation action, a cell selection or a character input. A user can provide such a first input using either the keyboard 34 or the mouse 36. At block 243, the edit import file routine 240 determines whether the first input is a navigation action or a cell selection. If the first input provided by a user is a navigation or a cell selection, at block 244 the edit import file routine 240 determines if an edit field with a focus exists. If an edit field with a focus exists, at block 245 the value contained in such an edit field is committed to the currently selected cell of the window 212. However, if at block 244 the edit import file routine 240 determines that no edit field with a focus exists, at block 246, it selects an appropriate cell in response to the user's action. For example such an action may be a navigation action, selection of a new cell by the mouse 36, etc.

If at block 243, it is determined that the first input is not a navigation or a cell selection, at block 247, the edit import file routine 240 determines if the first input was an alphanumeric character. If the first input is determined not to be an alphanumeric character, at block 248, the edit import file routine 240 determines if the first input was an escape (ESC) character. If the first input is determined to be an escape character, at block 249, the edit import file routine 240 reverts any edits to the content of the edit field and shifts the focus from the edit field to the window 212.

If at block 247 it is determined that the first input was an alphanumeric character, at block 250, the edit import file routine 240 determines if the edit field has the focus. If it is determined that the edit field does not have a focus, at block 251, the edit import file routine 240 shifts the focus to the edit field and at block 252 it processes any character input by the user to change the value in the edit field.

On the other hand if at block 248 it is determined that the first input is not an ESC character, at block 253, the edit import file routine determines if the first input is an OK signal or a cancel signal. Such an OK signal or a cancel signal can be input by pressing a button on the context menu activated by clicking a right mouse button on the mouse 36. If the input is determined to be other than an OK signal or a cancel signal, at block 254 the edit import file routine determines what menu choice is selected from the context menu.

At block 254, if the selected menu choice is determined to be a fill down choice, at block 255 the edit import routine 240 prompts the user to select a vertical range of cells from the window 212. After selecting the vertical range of cells the user can select the fill down choice from the context menu to copy the value of the topmost cell in the vertical range of cells into all the other cells in the vertical range of cells.

At block 254, if the selected menu choice is determined to be an increment down choice, at block 256 the edit import routine 240 prompts the user to select a vertical range of cells from the window 212 in which the upper most cell contains either a date or a numeric value. After selecting the vertical range of cells the user can select the increment down choice from the context menu, which results in a first value equal to the value of the topmost cell incremented by one to be copied to a first cell under the topmost cell, a second value equal to the first value incremented by one to be copied into a second cell under the first cell, etc. At block 254, if the selected menu choice is determined to be an insert date choice, at block 257 a current date and time stamp is inserted into the selected cell.

At block 253, if the edit import file routine 240 determines that the first input was an OK signal, at block 258, the edit import file routine 240 saves the first import file and the edit import file routine 240 ends at block 259. On the other hand, if at block 253, the first input is determined to be a cancel signal, the edit import file process 240 ends at block 259 without saving the first import file.

It should be noted that while the edit import file routine 240 is used to edit an import file, where an import file to be edited is specified by selecting the edit import button 211, the same routine can also be used to edit an output file if an output file is selected by selecting the edit output file button 225.

Figure 8:
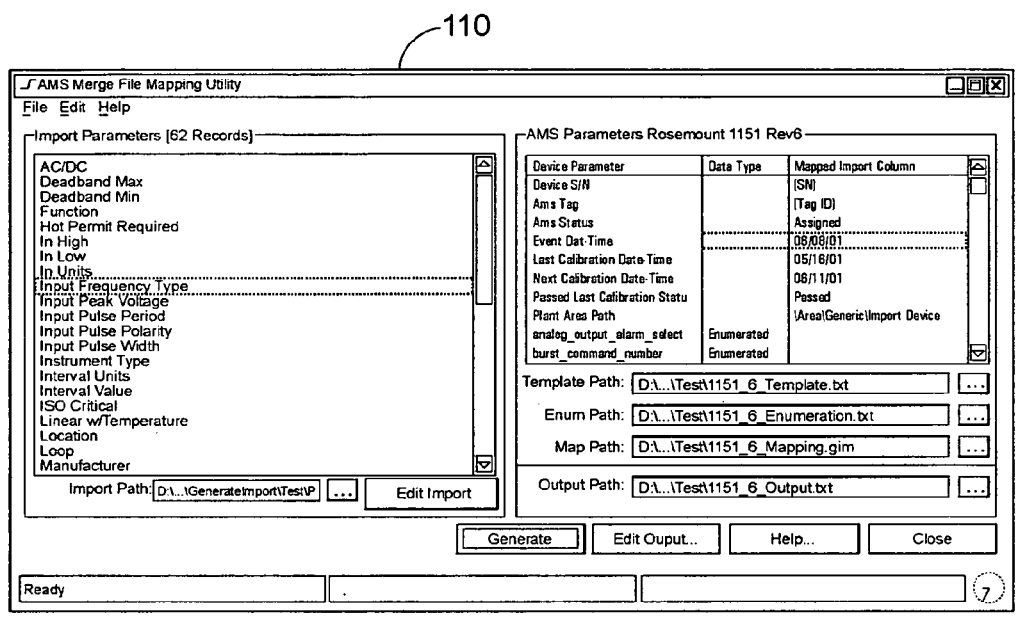
FIG. 8 is an exemplary illustration of an add import parameter template.
Figure 8:
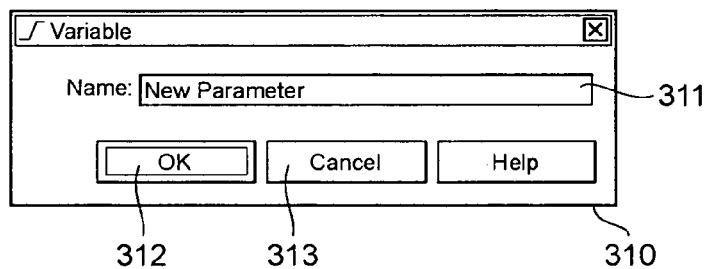

FIG. 8 shows an exemplary add import parameter template 310 that may be displayed by the AMS mapping utility 62 to allow a user to add an import parameter to the first import file, and the mapping utility startup template 110. The add import file template 310 may be activated by selecting an add import parameter choice from the context menu invoked by clicking a right mouse button on the mouse 36. A user can input a name of a first new parameter to be added to the first import file at 311, and select the OK button 312 to add the first new parameter to the first import file. Alternatively, a user can select the cancel button 313 to abort the operation of adding a new parameter to the first import file.

Figure 9:
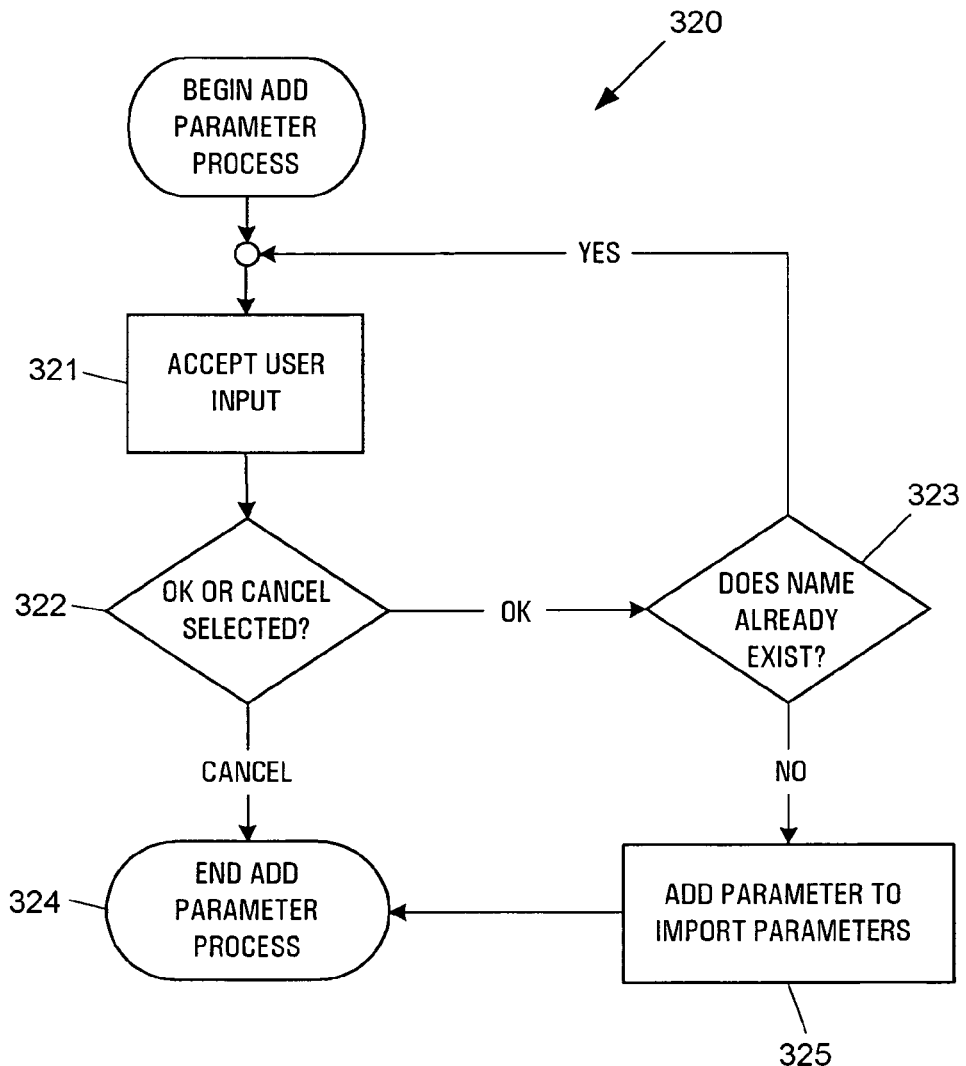
FIG. 9 is an exemplary illustration of an add import parameter routine.

FIG. 9 is an exemplary illustration of a flowchart illustrating an add import parameter routine 320 attached to the add import parameter template 310. At block 321, the add import parameter routine 320 accepts a first user input from the add import parameter template 310. At block 322, the add import parameter routine 320 determines if the first user input was an ok signal or cancel signal. If the first user input is determined to be a cancel signal, at block 324, the add import parameter routine 320 ends. If the first user signal is determined to be an ok signal, at block 323, the add import parameter routine 320 determines if the name of the first parameter input by the user at 311 in the template 310 already exists in the first import file. If the name of the first parameter already exists in the first import file, the add import parameter routine 320 displays an error message and asks the user to input a new name. If the name of the first parameter does not exist in the first import file, at block 325, the add import parameter routine 325 adds the first parameter to the first import file and this parameter will be available for mapping in the first window 112 in the mapping utility startup template 110.

Figure 10:
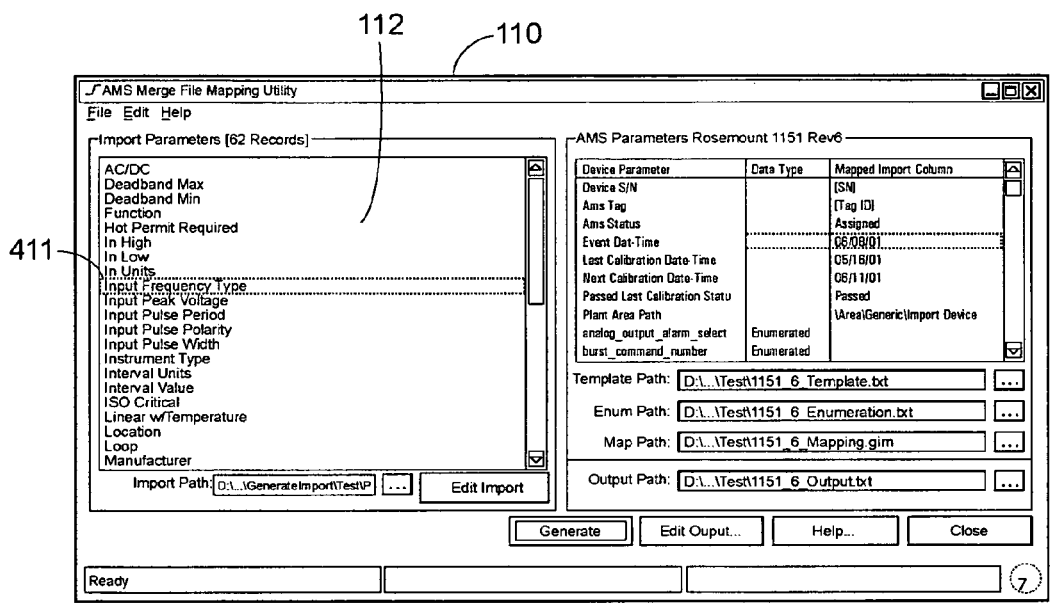
FIG. 10 is an exemplary illustration of a remove import parameter template.

FIG. 10 shows the mapping utility template 110 used to remove an import parameter from an import file. A user can select an import parameter to be removed from the first window 112. FIG. 10 also shows a second import parameter 411 selected to be removed from the first import file. After selecting the second import parameter 411, a user can activate the context menu by clicking a right mouse button on the mouse 36 and selecting a remove parameter button from such a context menu to remove the second import parameter 411 from the first import file.

Figure 11:
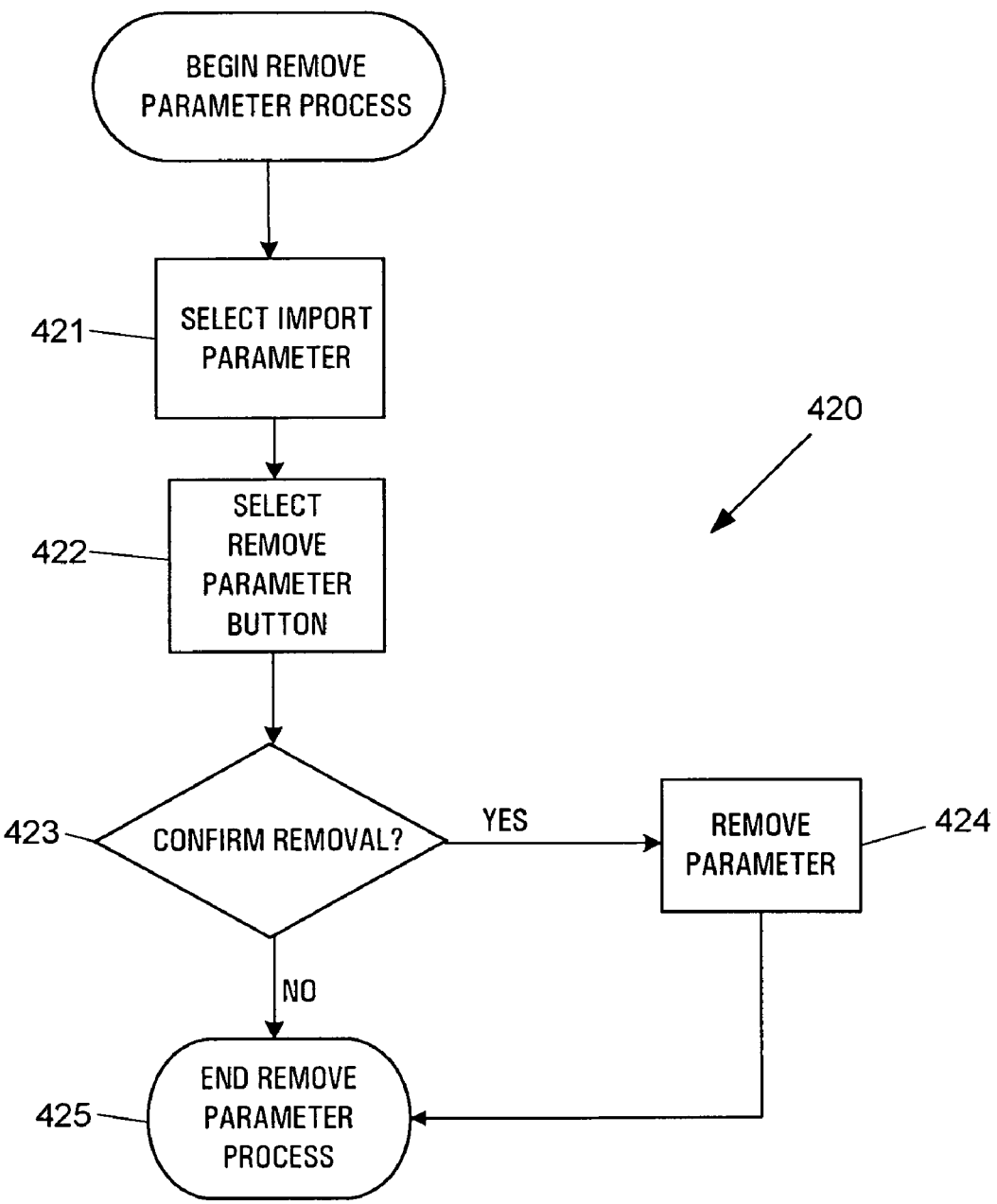
FIG. 11 is an exemplary illustration of a remove import parameter routine.

FIG. 11 shows a remove import parameter routine 420 attached to the mapping utility template 110. At block 421, the user selects the second import parameter 411 in the window 112. At block 422, a user selects a remove parameter button from the context menu. At block 423, the user is asked to confirm a removal of the second import parameter 411 from the first import file. If the user confirms the removal, at block 424, the remove import parameter routine 420 removes the second import parameter 411 from the first import file. If the user does not confirm the removal, the remove import parameter routine 420 ends at block 425 without removal of the second import parameter 411.

Figure 12:
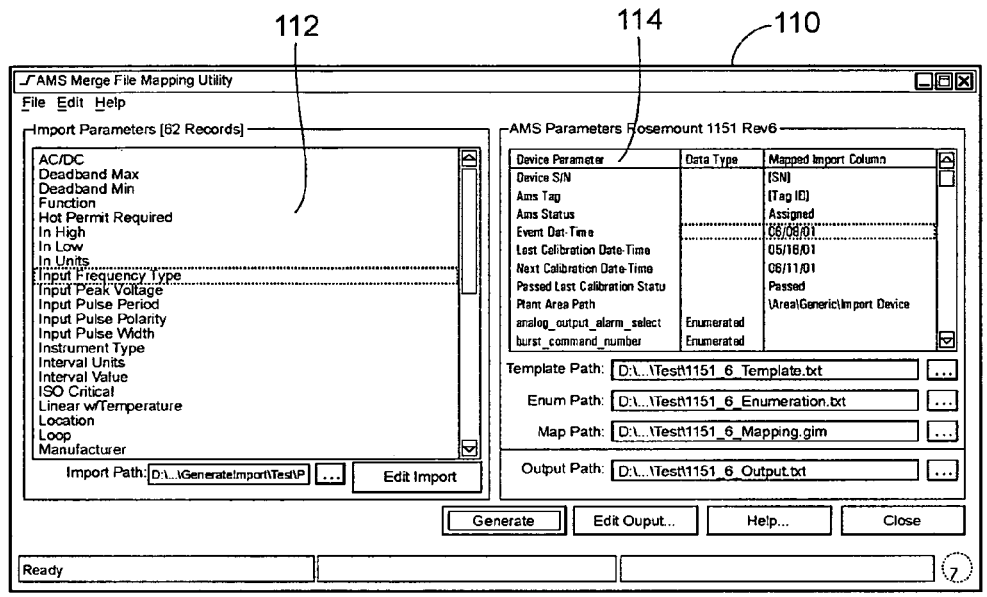
FIG. 12 is an exemplary illustration of a parameter mapping template.
Figure 12:
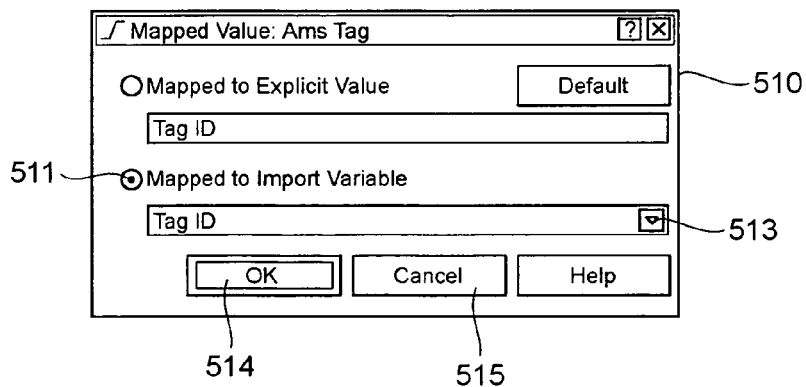

FIG. 12 shows a parameter mapping template 510 used to map an import parameter to an output parameter, and the mapping utility template 110. A user can invoke the parameter mapping template 510 by double-clicking on an output parameter in the first column 114 or by selecting an output parameter in the first column 114 and selecting an edit mapping button from the context menu invoked by clicking a right mouse button on the mouse 36. To map an import parameter to an output parameter, a user should select the mapped import parameter choice 511 on the parameter mapping template 510. For example, when a user selects a first output parameter from the first column 114 and invokes the parameter mapping template 510, the name of the first output parameter is shown in the field 512. To map a third import parameter to the first output parameter, the user inputs the name of the third import parameter at 513 in the parameter mapping template. At this point the user can complete a mapping between the third import parameter and the first output parameter by selecting an ok button 514. Alternatively, a user can select a cancel button 515 to close the parameter mapping template 510 without performing any mapping between the third input parameter and the first output parameter.

A user can also map the third import parameter to the first output parameter by double-clicking on the third import parameter in the first window 112. Such double-clicking on the third import parameter results in a cursor on the display 30 to be changed to a drag-drop pointer. The user can subsequently select the first output parameter from the first column 114 to map the third import parameter to the first output parameter.

Figure 13:
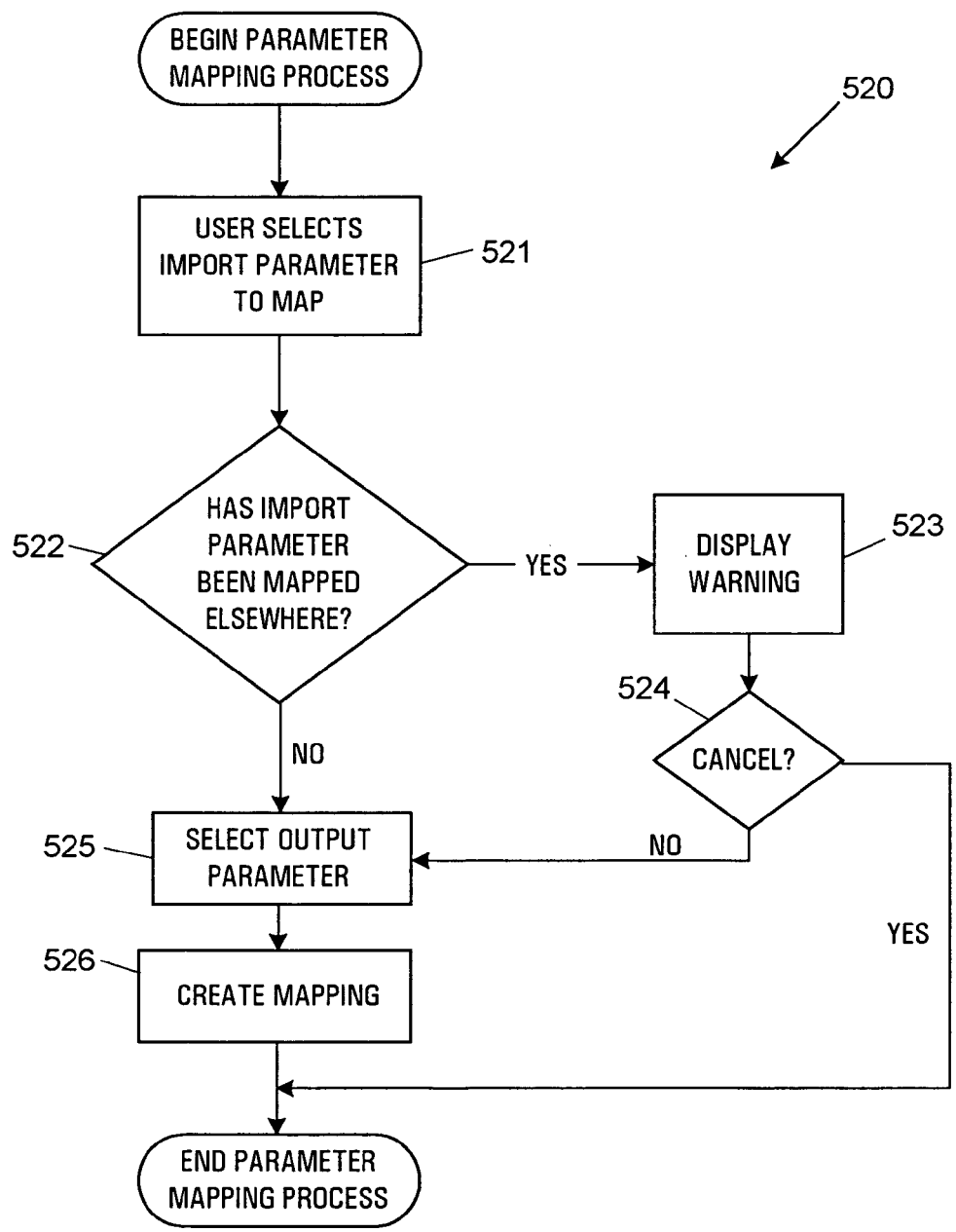
FIG. 13 is an exemplary illustration of a parameter mapping routine.

FIG. 13 shows a parameter mapping routine 520 to map the third import parameter to the first output parameter. At block 521, a user selects the third import parameter to map to the first output parameter. As described above a user can select the third import parameter by either double-clicking on the third import parameter or by invoking the mapping parameter template 510. At block 522, the parameter mapping routine 520 checks if the third import parameter is mapped to any other output parameter. If it is determined that the third import parameter is mapped to another output parameter, at block 523, the parameter mapping routine 520 displays a warning to the user to notify the user about potential multiple mapping of the third import parameter. At block 524, a user has a choice to cancel a mapping by selecting the cancel button 515 on parameter mapping template 510 or to go ahead and create a mapping by selecting the ok button 514 on the parameter mapping template 510. If the user selects the ok button 514, at block 525, the user selects the first output parameter to which the third import parameter is mapped to. At block 526, the parameter mapping routine 520 creates a mapping of the third import parameter to the first output parameter.

Figure 14:
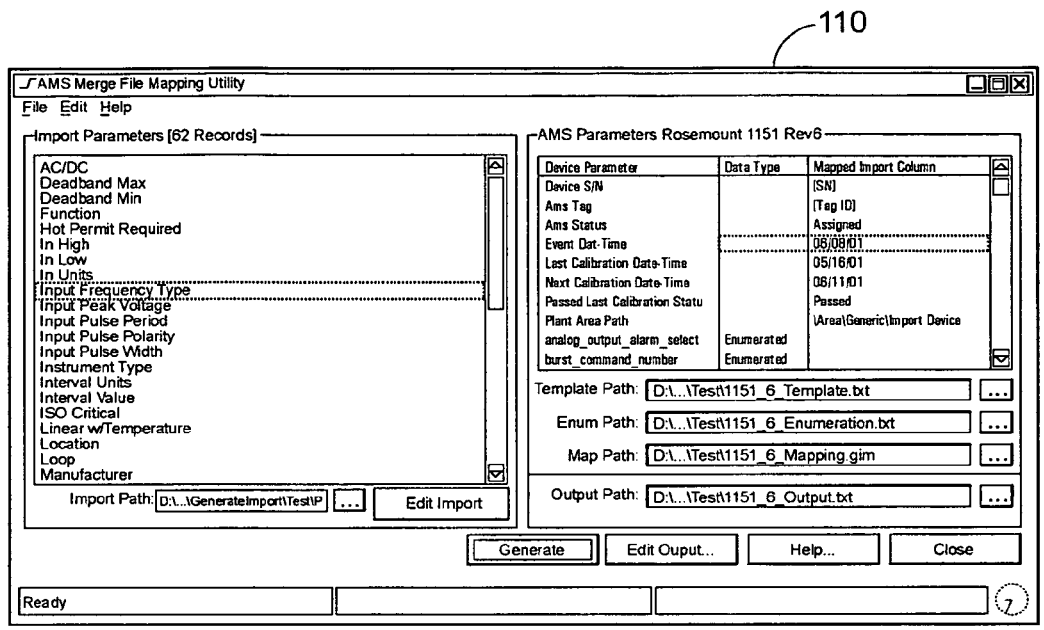
FIG. 14 is an exemplary illustration of an explicit value mapping template.
Figure 14:
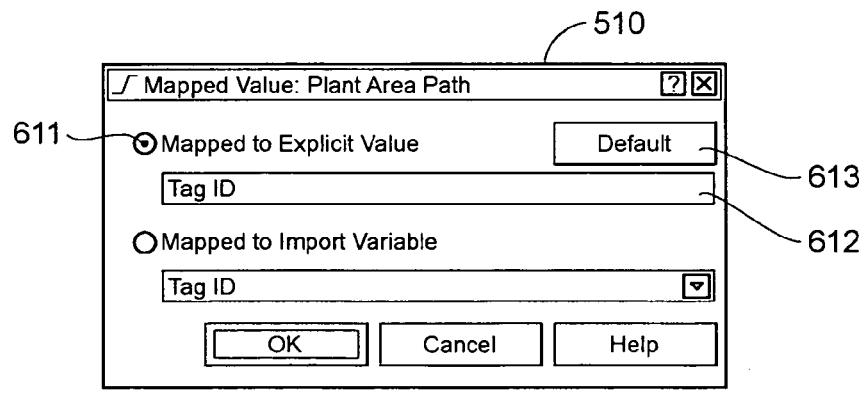

FIG. 14 shows the parameter mapping template 510 used to map a first explicit value to a second output parameter, and the mapping utility template 110. A user can invoke the parameter mapping template 510 by double-clicking on the second output parameter in the first column 114 or by selecting the second output parameter in the first column 114 and selecting an edit mapping button from the context menu invoked by clicking a right mouse button on the mouse 36. To map the first explicit value to the second output parameter, a user selects a mapped to explicit value choice 611 on the parameter mapping template 510. A user can input the first explicit value at field 612 to be mapped to the second output parameter.

If a type of data for the second output parameter is defined, the first explicit value input in field 612 must be of the data type defined for the second output parameter. For example, if the data type of the second output parameter is text, the first explicit value input at field 612 must be text as well. Other possible data types for the second output parameter may be date, numeric, enumerated, etc. If an enumerated list of possible values is defined for the second output parameter, the explicit value input at field 612 must be contained in such an enumerated list. If a default value provided for the second output parameter, a user can input such a default value at field 612 by selecting the default button 613. An explicit value to be mapped to an output parameter may also be specified by a replacement key which is replaced by a different value at a later time. For example, inputting a key of #DATE# as the first explicit value in field 612 will result in a current date to be mapped to the second output parameter. Other examples of such replacement keys are: #TIME# for current time, #APP# for name of an application, #PATH# for an application's working folder, #MAN# for manufacturer name, #DEV# for device name, etc.

Figure 15:
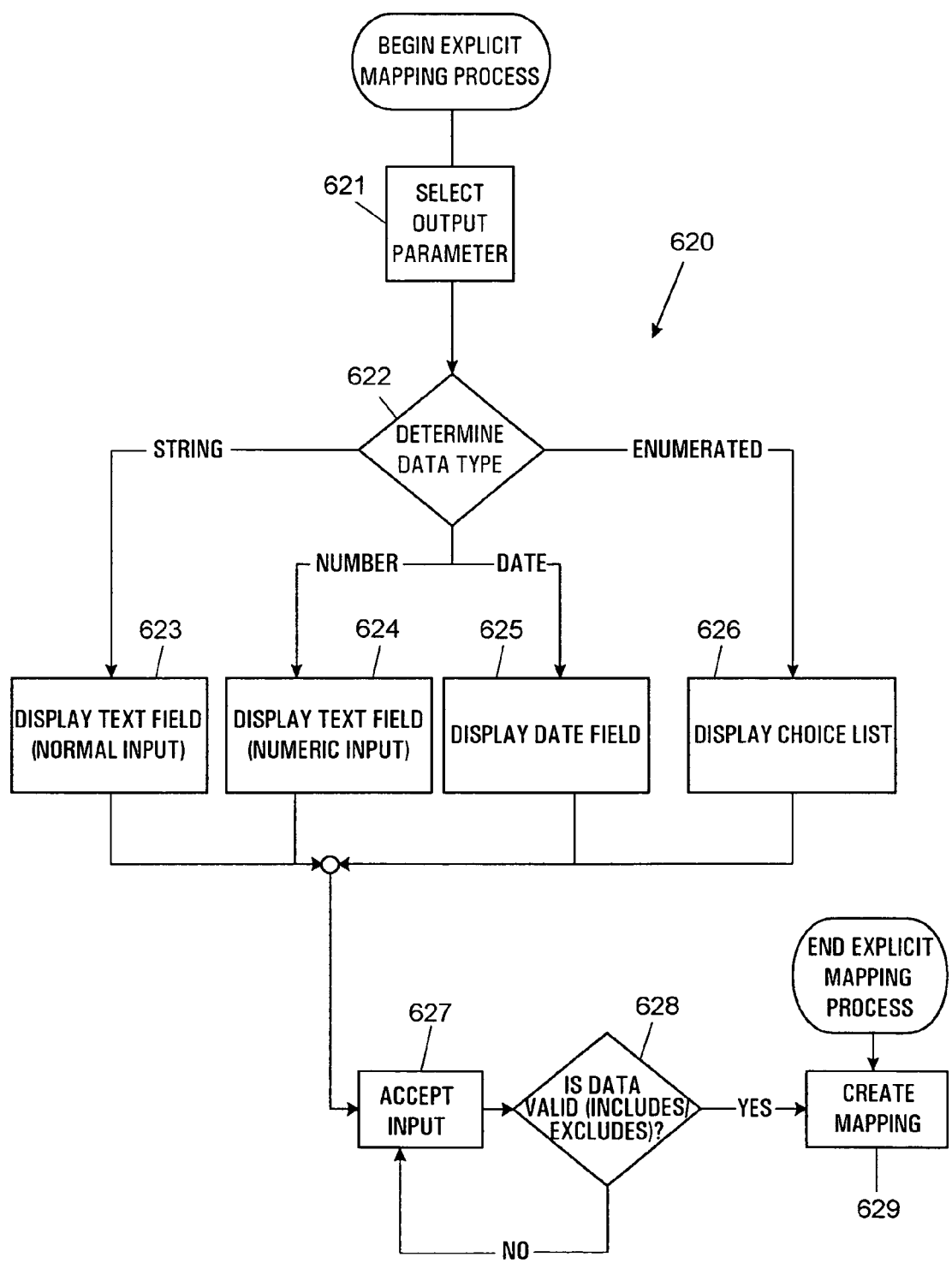
FIG. 15 is an exemplary illustration of an explicit value mapping routine.

FIG. 15 shows an explicit parameter mapping routine 620 used to map an explicit parameter value to the second output parameter. At block 621, a user selects, the second output parameter to which an explicit value needs to be mapped. At block 622, the explicit parameter mapping routine 620 determines what is a data type of the second output parameter. If the data type of the second output parameter is of a string type or of a number type, at blocks 623 and 624, the explicit parameter mapping routine 620 presents a normal input field at field 612 in the explicit parameter mapping template 610. If the data type of the second output parameter is a date type, at block 625, the explicit parameter mapping routine 620 presents a date input field at field 612. Similarly, if the data type of the second output parameter is an enumerated type, at block 626, the explicit parameter mapping routine 620 presents a drop down list with enumerated values at field 612. At block 627, the explicit parameter mapping routine 620 accepts an input value for a first explicit value provided by a user in 612. At block 628, the explicit parameter mapping routine 620 verifies whether a data type of the first explicit value input by a user matches the data type of the second output parameter. The routine 620 also verifies that the first explicit value input by a user is within any restrictions on values acceptable for the second output parameter. Such restrictions may include, for example, an alphanumeric character restriction for a text data type, a range restriction for a numeric data type, etc. If the first explicit value meets all the restriction criteria and if the first explicit value is valid, the explicit parameter mapping routine 620 creates a mapping of the first explicit value to the second output parameter at block 629.

Figure 16:
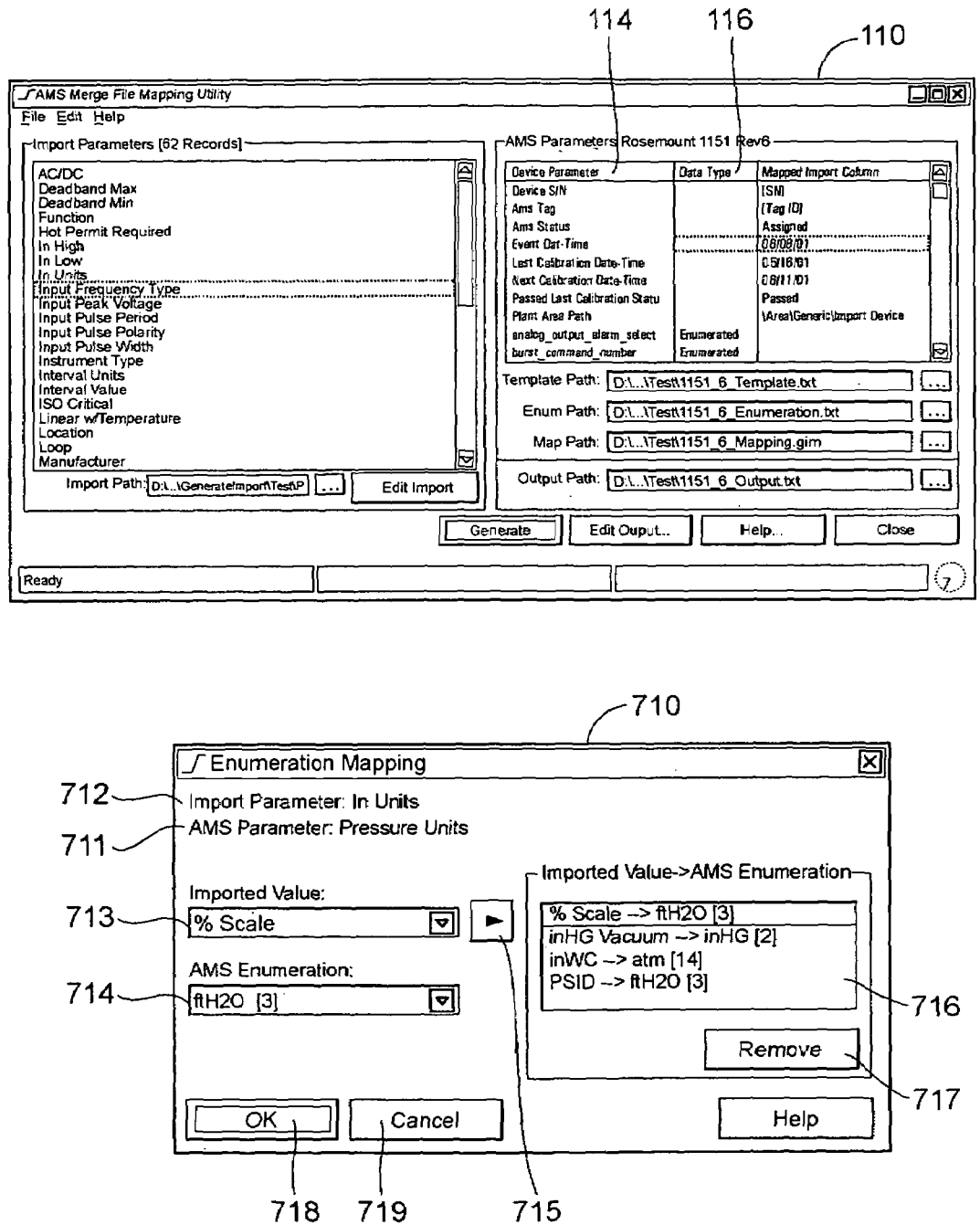
FIG. 16 is an exemplary illustration of an edit enumeration mapping template.

FIG. 16 shows an edit enumeration mapping template 710 used to edit an enumeration mapping for an output parameter, and a mapping utility template 110. A user selects a third output parameter from the first column 114 for which an enumeration mapping is to be edited. The third output parameter must be of enumerated type to edit its enumeration mappings. The second column 116 shows the type of a parameter in the first column 114. For example, in FIG. 16, an output parameter in the first output column 114 named burst_command_number is an enumerated type of parameter, as can be seen from the second column 116. An edit enumeration mapping template 710 can be invoked by selecting an edit enumeration mapping button from a context menu that can be activated clicking a right mouse button on the mouse 36.

When a user activates the edit enumeration mapping template 710 to edit enumerations for a third output parameter, the name of the third output parameter and a fourth import parameter which is mapped to the third output parameter are displayed at 711 and 712 on the edit enumeration mapping template 710. A first input field 713 provides a drop down list of values in the first import file that may be attached to the fourth import parameter. A second input field 714 provides a drop down list of values that are allowable for the third output parameter in the AMS database 60. After selecting a first import value attached to the fourth import parameter in the first input field 713 and a first enumerated output value attached to the third output parameter in the second input field 714, a user can select an add enumeration mapping button 715 to map the first import value to the first enumerated output value. Once the add enumeration mapping button 715 is selected, an enumeration of the first import value to the first enumerated output value is shown in an enumeration mapping window 716.

A user can select an enumeration mapping shown in the enumeration mapping window 716 and select the remove enumeration mapping button 717 to remove an enumeration mapping between the fourth import parameter and the third output parameter. At any time a user can select to save the enumeration mappings shown in the enumeration mapping window 716 by selecting an ok button 718. Selecting the cancel button 719 causes the edit enumeration mapping window to close without saving any edits made to the enumeration mappings shown in the enumerations mapping window 716.

Figure 17:
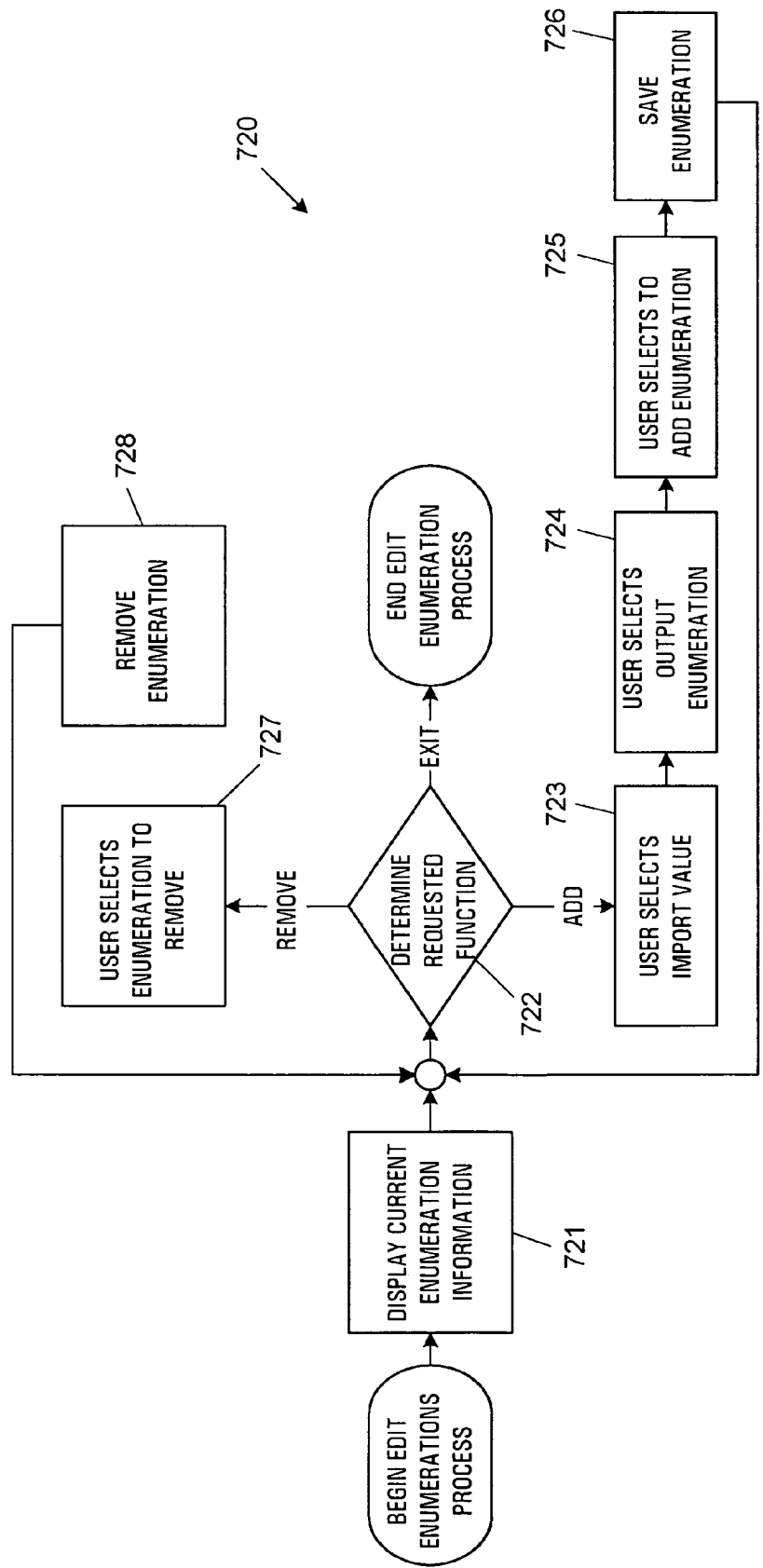
FIG. 17 is an exemplary illustration of an edit enumeration mapping routine.

FIG. 17 shows an edit enumerations mapping routine 720 attached to edit an enumeration mapping for the third output parameter. To edit an enumeration mapping for the third output parameter, a user may select the third output parameter from the first column 114 in the mapping utility template 110 and activate the edit enumeration mappings routine 720. At block 721 the edit enumerations mapping routine 720 displays the edit enumerations mapping template 710 with the current enumeration mappings for the third output parameter. At block 722, a user determines which operation to perform using the edit enumeration mappings template 710.

If a user wants to add an enumeration mapping for the third output parameter, at 723 the user selects the first import value in the first input field 713 of the edit enumeration mappings template 710. At block 724, the user selects the first enumerated output value in the second input field 714. At block 725 the user selects the add enumeration button 715 to create the enumeration mapping between the first input value and the first enumerated output value. At block 726 the user can select an ok button 718 to save the enumeration mapping.

If a user wants to remove an enumeration mapping for the third output parameter, at block 727 the user can select an enumeration mapping to be removed in the enumeration mapping window 716 of the edit enumerations mapping template 710. At block 728 the user can select the remove enumeration mapping button 717 to remove a selected enumeration mapping.

Figure 18:
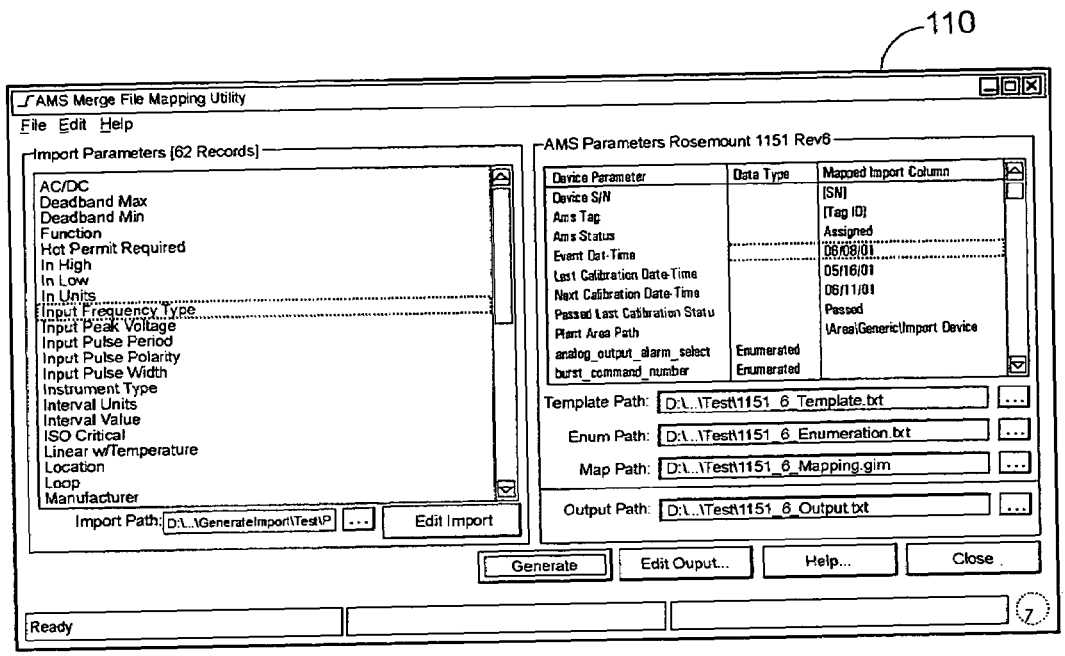
FIG. 18 is an exemplary illustration of a modify output parameter default template.
Figure 18:
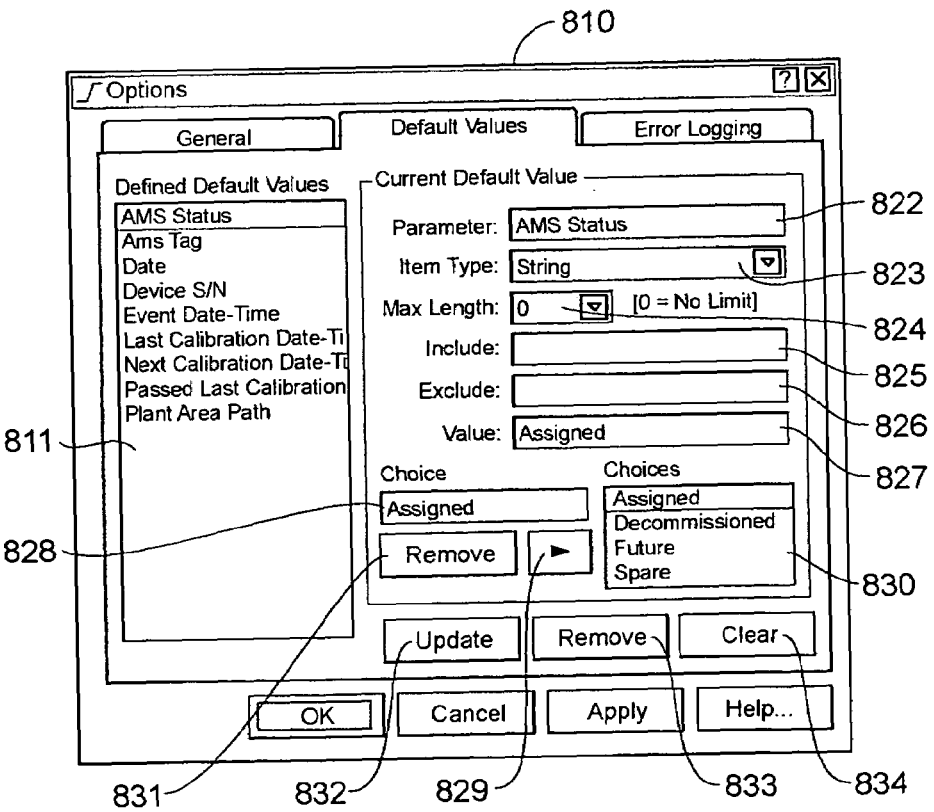

FIG. 18 shows a modify output parameters default template 810 to modify a default setting for an output parameter. A user can activate the modify output parameters default template 810 by clicking a right mouse button on the mouse 36. A user can input various information regarding a default setting of an output parameter by selecting a default values tab of the modify output parameters default template 810.

A defined default values window 811 lists various output parameters in the first output file for which a default setting is defined. To change a default setting of a fourth output parameter, a user can either select the fourth output parameter from the defined default values window 811 or the user can type in a name of the fourth parameter in a parameter input field 822. A type of the fourth output parameter can be selected from a drop down list in an item type input field 823. The type of the fourth output parameter selected in the item type input field 823 affects what default values can be assigned to the fourth output parameter. For example, if the item type of the fourth output parameter is selected to a number type, only numeric values can be assigned to the fourth output parameter. Other possible item types for an output parameter include, for example, a date type, a string type, etc.

A maximum length of the fourth output parameter can be selected from a drop down list in a maximum length input field 824. The maximum length of the fourth output parameter controls a number of characters that may be input in the fourth output parameter. A selection of maximum length equal to zero allows any number of characters to be included in the fourth output parameter.

An include characters input field 825 allows the definition of a list of explicit characters that may be included in the fourth output parameter. For example, entering a string of "0123456789" in the include characters input field 825 will limit entry of characters to the fourth output parameter to numeric values only.

An exclude characters input field 826 allows definition of a list of explicit characters that may be excluded from the fourth output parameter. For example, entering a string of "aeiou" in the exclude characters input field 826 will limit entry of characters for the fourth output parameter to any characters except for characters a, e, i, o and u, such that if a user inputs a string of "lazy brown dog" in the fourth output parameter, only a string of "lzy brwn dg" will be entered in the fourth output parameter.

A default value input field 827 allows a user to define an explicit value to be mapped to the fourth output parameter as a default value. However, if any restriction to a value of the fourth output parameter is selected in one of the other input fields of the modify output parameter defaults template 810, such restriction applies to a value input in the default value input field 827. For example, if an input in the maximum length input field 824 is 5, the modify output parameter defaults template 810 will not allow entry of a value containing more than five characters in the default value input field 827. In addition to inputting explicit default values in the default values input field 827, a user can also input one or more replacement keys such as #DATE#, #TIE#, #APP#, #PATH#, #MAN#, #DEV#, etc., in the default value input field 827. The AMS mapping utility 62 converts such replacement key with a value for the fourth output parameter. For example, a key of #DATE# is replaced with a current date.

An enumerated value choice input field 828 allows a user to input an explicit list of acceptable values for the fourth output parameter. A user can input a value in the enumerated value choice input field 828 and select an add enumerated value button 829 to add the value to a first list of enumerated values that may be acceptable for the fourth output parameter. The first list enumerated values is displayed in a choices window 830. Once a user has added at least one value in the first list of enumerated values, only a value that is contained in this list will be allowed to be input in the fourth output parameter. A user can also remove a value from the first list of enumerated values by selecting a value from the first list of enumerated values in the choice window 830 and selecting a remove enumerated value button 831.

Once a user has selected the fourth output parameter from the defined default values window 811 or input the name of the fourth parameter in the parameter input field 822, the user can input one or more values in any of the other input fields of the modify output parameter defaults template 810 and select an update button 832 to update a default setting for the fourth output parameter. To remove a default setting assigned to an output parameter, a user can select an output parameter in the defined default values window 811 and select a remove default setting button 833. Selecting a clear default values button 834 allows a user to clear all of the input fields in the modify output parameter defaults template 810.

Figure 19:
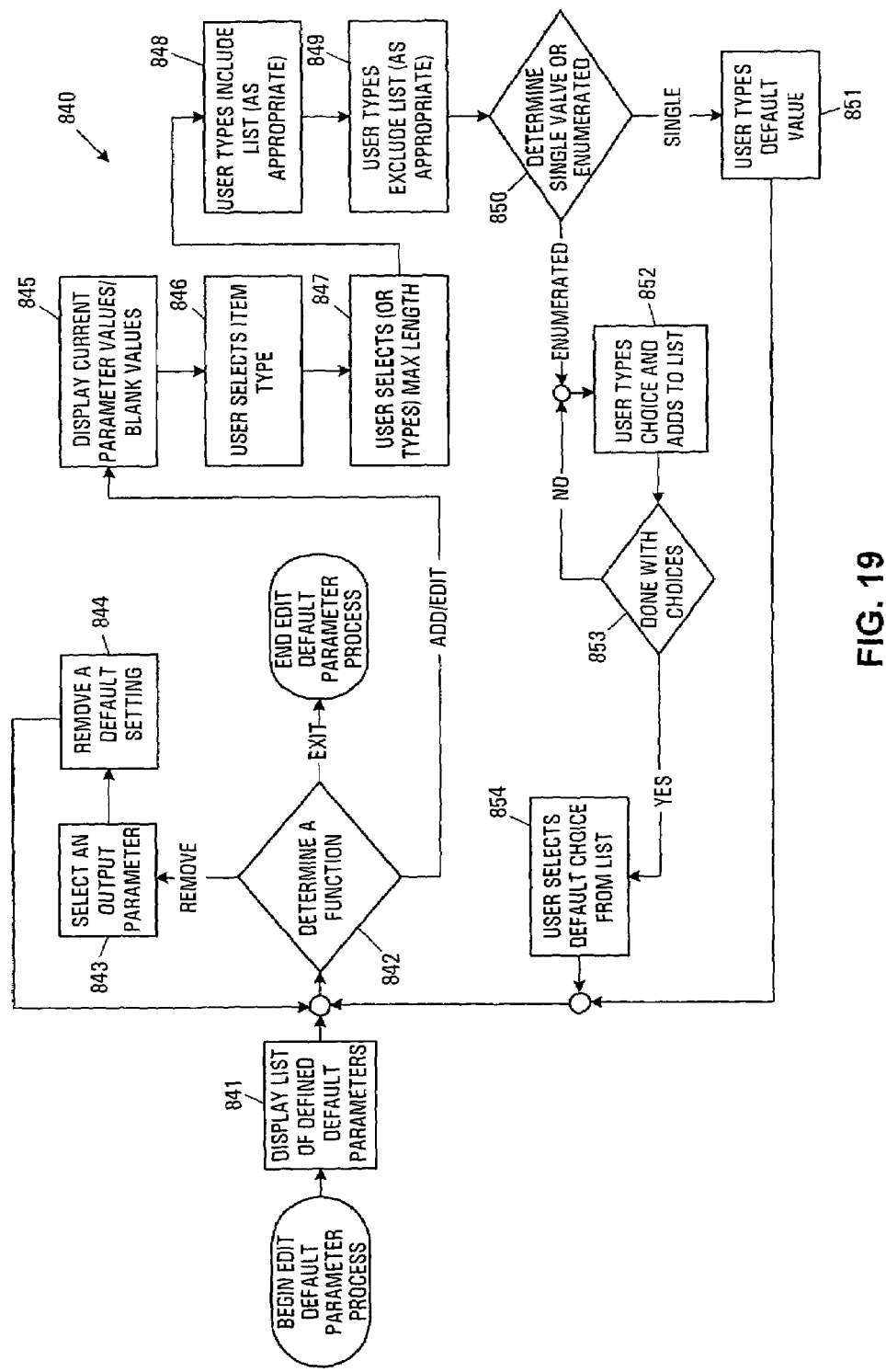
FIG. 19 is an exemplary illustration of a modify output parameter default routine.

FIG. 19 shows a modify output parameter defaults routine 840 to modify a default setting for an output parameter. At block 841, the modify output parameters default routine 840 displays a first list of defined default parameters in the defined default values window 811. At block 842, a user selects either to remove a default setting for the fourth output parameter or to add/edit a default setting for the fourth output parameter. To remove a default setting for the fourth output parameter, at block 843, a user may select the fourth output parameter from the first list of defined default parameters. At block 844, the user may select the remove default setting button 833 to remove a default setting for the fourth output parameter.

To add a default setting to the fourth output parameter or to edit a default setting of a fourth output parameter, at block 845, a user selects the fourth output parameter from the first list of defined default parameters in the defined default values window 811 or inputs a name of the fourth output parameter in the parameter input field 822. At block 846, the user selects a type of the fourth output parameter from the drop down list in the item type input field 823. At block 847, the user selects a maximum length of the fourth output parameter from the drop down list in the maximum length input field 824. At block 848, the user inputs the list of characters that may be included in the fourth output parameter in the include characters input field 825. At block 849, the user inputs the list of characters that may be excluded from the fourth output parameter in the exclude characters input field 826. At block 850, the user determines if a single default value or an enumerated default value is to be mapped to the fourth output parameter. If a single default value is to be mapped to the fourth output parameter, at block 851 the user inputs an explicit default value in the default value input field 827. If an enumerated default value is to be mapped to the fourth output parameter, at block 852 the user inputs an enumerated default value in the enumerated value choice input field 828. At block 853, the user determines if more enumerated default values need to be input. Once all the enumerated default values are input, at block 854 the user selects one enumerated default value from the list of enumerated default values displayed in the choices window 830.

Figure 20:
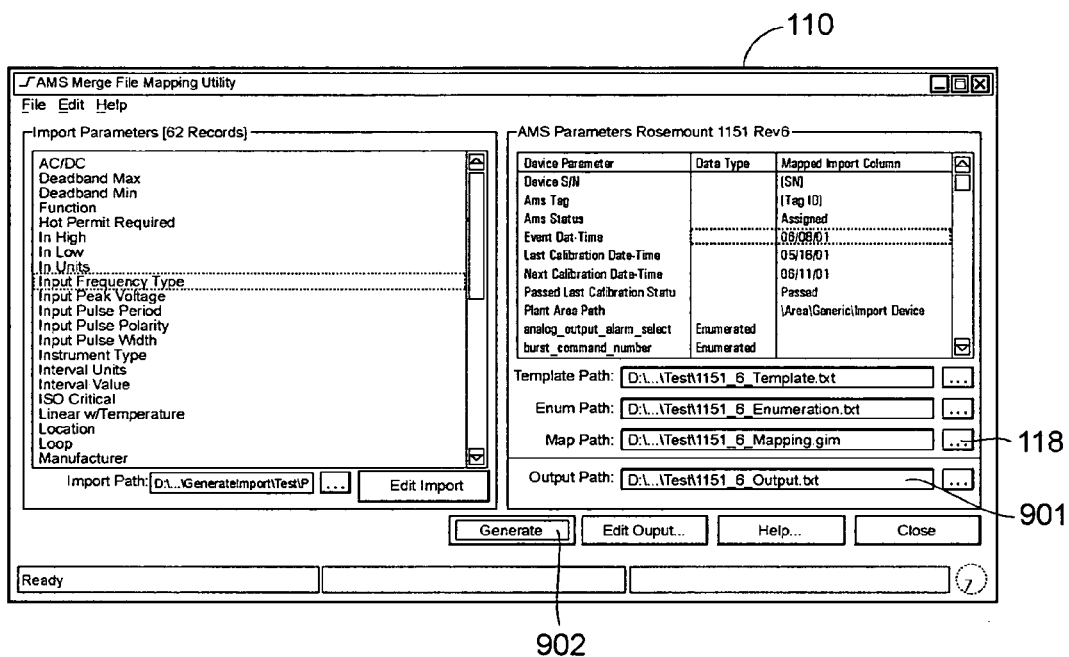
FIG. 20 is an exemplary illustration of a generate output file template.

FIG. 20 shows the mapping utility template 110 used to generate a first output file that contains a number of records in a format similar to the format used by the AMS database 60. A path of the first output file can be defined in an output path input window 901 by selecting the define output path button 119. Once a path for the first output file is defined, a user can generate the first output file by selecting the generate output file button 902. Such an output file is stored in the output file database 74.

Figure 21:
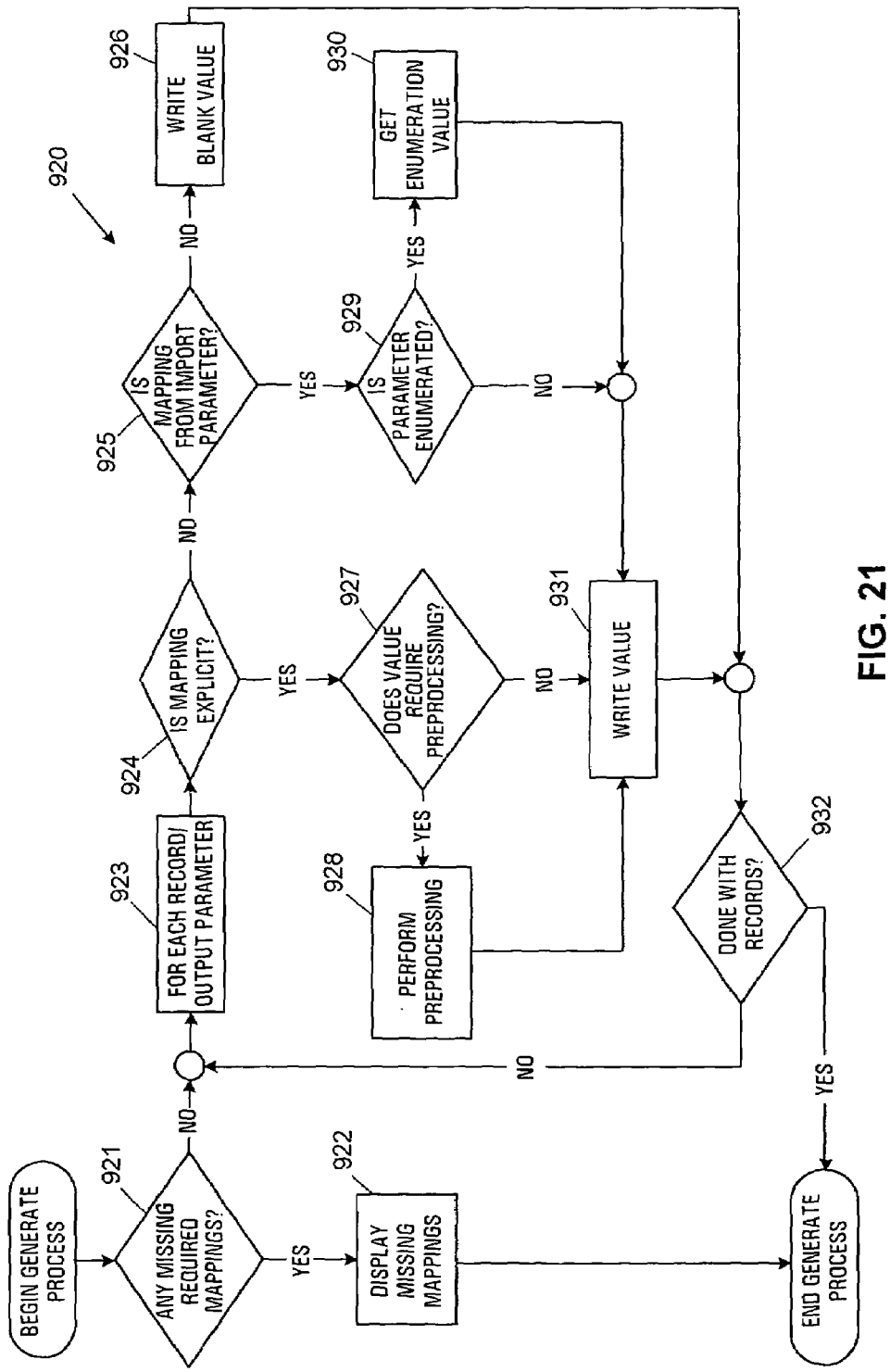
FIG. 21 is an exemplary illustration of a generate output file routine.

FIG. 21 shows a generate output file routine 920. When a user selects to create the first output file by selecting the generate output file button 902, at block 921, the generate output file routine 920 verifies various mappings between the output parameters of the first output file and the import parameters of the first import file for their completeness and accuracy. If any errors in such mappings is found, at block 922, the generate output file routine 920 displays a warning of missing or erroneous mappings.

Once the generate output file routine 920 has verified the accuracy and completeness of various mappings, at block 923 the generate output file routine 920 starts writing values for various parameters for a first record in the output file. At block 924, the generate output file routine 920 checks a mapping for a fifth output parameter to see if such a mapping is explicit or not. If a mapping for an output parameter is not explicit, at block 925, the generate output file routine 920 checks if there is a mapping for the fifth output parameter to an import parameter. If there is no mapping for the fifth output parameter to an import parameter, at block 926, the generate output file routine 920 writes a black value for the fifth output parameter in the output file.

If the mapping for the fifth output parameter is found to be explicit, at block 927, the generate output file routine 920 checks if the explicit value for the fifth output parameter needs to be reprocessed. Such reprocessing may be necessary to change an explicit value input at the input field 827 of the output parameters default template 810 to comply with various restrictions input in input fields 824, 825, 826, etc. If it is found that a reprocessing of an explicit value is necessary a reprocessing is performed at block 928. For example if an explicit value input at input field 827 is "December" and a maximum length for such a string, as specified in the input field 824 is 3 characters, at block 928 such an explicit value is pre-processed to a value of "Dec."

If at block 925, the generate output file routine 920 finds that there is a mapping for the fifth output parameter to an import parameter, at block 929, the generate output file routine 920 checks if the fifth output parameter is enumerated or not. If the fifth output parameter is found to be enumerated, at block 930, the generate output file routine 920 finds the enumerated value for the fifth output parameter corresponding to a value of an input parameter which is mapped to such the fifth output parameter. At block 931, the generate output file routine 920 writes a value determined at one of the blocks 927, 928, 929 and 930 into the first output file for the record selected at 923. At block 932, the generate output file routine 920 checks if there are any more records in the import file that need to be processed and written in the first output file.

The mapping utility described in here allows users to import data about various types of devices into the AMS database on a systematic and efficient method. Such a mapping utility allows a user to maintain a complete database including all devices used within a process plant. Also, when the mapping utility described here is used to import device data, the integrity of the data in the database can be maintained at a much higher level compared to a manual importing of such data. Similarly, when the mapping utility is used to import data regarding more than one type of devices, there is a consistency between the enumerations for each of the device type, irrespective of the user who imported such data. Such consistency is hard to achieve using various manual methods used in importing device data into AMS.

Many modifications and variations may be made in the techniques and structures described and illustrated herein without departing from the spirit and scope of the present invention. Accordingly, it should be understood that the methods and apparatus described herein are illustrative only and are not limiting upon the scope of the present patent.

What is claimed is:

1. A method of mapping a set of import parameters specifying a device in a first set of import data to a set of output parameters specifying the device in an asset management system database, the method comprising:
    receiving the set of import parameters from an import file containing the first set of import data in a plurality of import records, each import record containing a plurality of import values, each import value corresponding to an import parameter from the set of import parameters;
    receiving the set of output parameters from the asset management system database;
    creating a first mapping of the set of import parameters to the set of output parameters;
    generating a mapping file containing the first mapping;
    generating an output file using the mapping file, where the output file contains a first set of output data containing a first set of output records, each output record containing a plurality of output values, each output value corresponding to an output parameter from the set of output parameters; and
    merging the first set of output data from the output file into the asset management system database;
    wherein receiving the set of import parameters comprises:
    receiving from a user a first set of device information including a name of a manufacturer of the device, a name of a model of the device, and a value representing a revision of the device;
    based on the first set of device information, opening the import file containing the set of import parameters; and
    receiving the set of import parameters from the import file.

2. The method of claim 1, further comprising receiving definitions of access variables, commands and operating procedures related to the device.

3. The method of claim 1, wherein receiving the set of output parameters comprises:
    opening a template file containing the set of output parameters based on the first set of device information; and
    receiving the set of output parameters from the template file.

4. The method of claim 3, wherein creating the first mapping of the set of import parameters to the set of output parameters comprises:
    displaying a first listing of the set of import parameters;
    displaying a second listing of the set of output parameters;
    selecting a first import parameter from the first listing;
    selecting a first output parameter from the second listing; and
    mapping the first import parameter to the first output parameter.

5. The method of claim 4, wherein the first listing and the second listing are provided in a first window on a computer output device.

6. The method of claim 5, wherein the first listing is provided on a first grid containing a first column containing a first plurality of cells, at least one of the first plurality of cells containing an import parameter from the set of import parameters, and wherein the second listing is provided on a second grid containing a second column with a second plurality of cells, at least one of the second plurality of cells containing an output parameter from the set of output parameters, a third column containing a third plurality of cells, at least one of the third plurality of cells containing a data type of an output parameter from the set of output parameters, and a fourth column containing a fourth plurality of cells, at least one of the fourth plurality of cells containing an import parameter from the set of import parameters.

7. The method of claim 6 further comprising:
    receiving a name of a second import parameter from a user, where the second import parameter is not in the first listing of the set of import parameters;
    adding the second import parameter to the set of import parameters; and
    displaying the second import parameter in a cell in the first column in the first window.

8. The method of claim 6, further comprising:
    selecting a first cell from the first column containing a third import parameter from the set of import parameters;
    receiving an instruction from a user to delete the third import parameter;
    removing the third import parameter from the set of import parameters; and
    deleting the first cell from the first column.

9. The method of claim 6, further comprising:
listing the first set of import data in a second window on the computer output device, where the second window contains a third grid containing a fifth plurality of cells where at least one of the fifth plurality of cells contain an import value from the plurality of import values;
selecting a first cell from the fifth plurality of cells, where the first cell contains a first import value of a first import record corresponding to a fourth import parameter from the set of import parameters;
changing the value of the first cell from the first import value to a second import value; and
assigning the second import value to the fourth import parameter in the first import record.

10. The method of claim 9, wherein changing the value of the first cell comprises:
copying the second import value from a second cell from the fifth plurality of cells; and
pasting the second import value into the first cell.

11. The method of claim 9, wherein changing the value of the first cell comprises:
copying the second import value from a third cell of the fifth plurality of cells, where the third cell lies at the top of a fifth column containing the first cell in the third grid; and
pasting the second import value into each cell lying between the third cell and the first cell in the fifth column.

12. The method of claim 9, wherein changing the value of the first cell comprises:
copying a third import value from a fourth cell of the fifth plurality of cells, where the fourth cell lies at the top of a sixth column in the third grid containing the first cell;
increasing the third import value by a predetermined number to get the second import value; and
pasting the second import value into the first cell.

13. The method of claim 6, wherein selecting the first import parameter and selecting the first output parameter comprises:
double-clicking on a cell in the second column containing the first output parameter;
opening a first input template to receive the first import parameter;
providing a third listing of import parameters from the set of import parameters on the first input template; and
receiving an input from a user selecting the first import parameter from the third listing of import parameters.

14. The method of claim 6, wherein selecting the first import parameter and selecting the first output parameter comprises:
double-clicking on a cell in the first column containing the first import parameter;
changing a cursor on the first window to a drag-drop pointer; and
clicking on a cell in the second column containing the first output parameter.

15. The method of claim 6, further comprising:
based on the first set of device information, opening an enumeration file containing a first set of enumerated values corresponding to the first output parameter.

16. The method of claim 15, further comprising:
providing a first list of import values corresponding to the first import parameter in the first set of data;
selecting a first import value from the first list of import values;
providing a second list of enumerated values from the first set of enumerated values corresponding to the first output parameter;
selecting a first enumerated value from the first list of enumerated values; and
creating an enumeration mapping of the first import value to the first enumerated value.

17. The method of claim 16, further comprising:
selecting the first output parameter from the second column;
presenting a second template to receive a first set of output parameter characteristics for the first output parameter, where the first set of output parameter characteristics includes at least one of: (1) a type of the first output parameter, (2) a maximum length of the first output parameter, (3) a first explicit set of characters that may be included in a value of the first output parameter, (4) a second explicit set of characters that are excluded from a value of the first output parameter, (5) a default value of the first output parameter, and (6) an enumerated list of acceptable values of the first output parameter; and
receiving from a user a value representing at least one of the characteristics of the first set of output parameter characteristics.

18. The method of claim 12 further comprising creating a second mapping of a second output parameter to a first explicit value.

19. The method of claim 18 wherein creating the second mapping comprises:
providing a first input field on the first input template to receive the first explicit value;
receiving the first explicit value from a user in the first input field; and
creating the second mapping of the second output parameter to the first explicit value.

20. The method of claim 19, further comprising:
receiving a first replacement key from a user in the first input field;
converting the first replacement key to a second explicit value; and
mapping the second explicit value to the second output parameter.

21. The method of claim 20, wherein the first replacement key is selected as one of: (1) a date key, (2) a time key, (3) a name of application key, (4) a manufacturer's name key, (5) a path key, and (6) a device name key.

22. The method of claim 6, further comprising:
listing the first set of output data in a third window on the computer output device, where the third window contains a fourth grid containing a sixth plurality of cells where at least some of the sixth plurality of cells contain output values from the plurality of output values;
selecting a fifth cell from the sixth plurality of cells, where the fifth cell contains a first output value of a first output record corresponding to a second output parameter from the set of output parameters;
changing the value of the fifth cell from the first output value to a second output value; and
assigning the second output value to the second output parameter in the first output record.

23. A computer system that maps a set of import parameters specifying a device in a first set of import data in an import file to a set of output parameters specifying the device in an asset management system database, wherein the first set of import data contains a plurality of import records, each import record containing a plurality of import values, each import value corresponding to an import parameter from the set of import parameters, the computer system comprising:
- a computer readable medium;
- a processing unit;
- a first routine stored on the computer readable medium and adapted to run on the processing unit to receive the set of import parameters;
- a second routine stored on the computer readable medium and adapted to run on the processing unit to receive the set of output parameters;
- a third routine stored on the computer readable medium and adapted to run on the processing unit to create a first mapping of the set of import parameters to the set of output parameters;
- a fourth routine stored on the computer readable medium and adapted to generate a mapping file containing the first mapping;
- a fifth routine stored on the computer readable medium and adapted to generate an output file using the mapping file, where the output file contains a first set of output data containing a first set of output records, each output record containing a plurality of output values, each output value corresponding to an output parameter from the set of output parameters;
- a further fifth routine stored on the computer readable medium and adapted to merge the first set of output data from the output file into the asset management system database;

wherein the first routine further comprises:
- a sixth routine stored on the computer readable medium and adapted to receive from a user a first set of device identifying information including a name of a manufacturer of the device, a name of a model of the device and a value representing a revision of the device;
- a seventh routine stored on the computer readable medium and adapted to open the import file containing the set of import parameters based on the first set of device identifying information; and
- an eighth routine stored on the computer readable medium and adapted to receive the set of import parameters from the import file.

24. The computer system of claim 23 wherein the first routine further comprises:
- a ninth routine stored on the computer readable medium and adapted to open a template file containing the set of output parameters based on the first set of device identifying information; and
- a tenth routine stored on the computer readable medium and adapted to receive the set of output parameters from the template file.

25. The computer system of claim 24 wherein the third routine further comprises:
- an eleventh routine stored on the computer readable medium and adapted to display a first listing of the set of import parameters;
- a twelfth routine stored on the computer readable medium and adapted to display a second listing of the set of output parameters;
- a thirteenth routine stored on the computer readable medium and adapted to select a first import parameter from the first listing;
- a fourteenth routine stored on the computer readable medium and adapted to select a first output parameter from the second listing; and
- a fifteenth routine stored on the computer readable medium and adapted to map the first import parameter to the first output parameter.

26. The computer system of claim 25 wherein the first listing and the second listing are provided in a first window on a computer output device.

27. The computer system of claim 26 wherein the first listing is provided on a first grid containing a first column containing a first plurality of cells, at least one of the first plurality of cells containing an import parameter from the set of import parameters, and wherein the second listing is provided on a second grid containing a second column with a second plurality of cells, at least one of the second plurality of cells containing an output parameter from the set of output parameters, a third column containing a third plurality of cells, at least one of the third plurality of cells containing a data type of an output parameter from the set of output parameters, and a fourth column containing a fourth plurality of cells, at least one of the fourth plurality of cells containing an import parameter from the set of import parameters.

28. The computer system of claim 27, further comprising:
- a sixteenth routine stored on the computer readable medium and adapted to open an enumeration file based on the first set of device identifying information, containing a first set of enumerated values corresponding to the first output parameter.

29. The computer system of claim 28, further comprising:
- a seventeenth routine stored on the computer readable medium and adapted to provide a first list of import values corresponding to the first import parameter in the first set of data;
- an eighteenth routine stored on the computer readable medium and adapted to select a first import value from the first list of import values;
- a nineteenth routine stored on the computer readable medium and adapted to provide a second list of enumerated values from the first set of enumerated values corresponding to the first output parameter;
- a twentieth routine stored on the computer readable medium and adapted to select a first enumerated value from the first list of enumerated values; and
- a twenty-first routine stored on the computer readable medium and adapted to create an enumeration mapping of the first import value to the first enumerated value.

30. The computer system of claim 29, further comprising:
- a twenty-second routine stored on the computer readable medium and adapted to select the first output parameter from the second column;
- a twenty-third routine stored on the computer readable medium and adapted to present a second template to receive a first set of output parameter characteristics for the first output parameter, where the first set of output parameter characteristics includes at least one of: (1) a type of the first output parameter, (2) a maximum length of the first output parameter, (3) a first explicit set of characters that may be included in a value of the first output parameter, (4) a second explicit set of characters that are excluded from a value of the first output parameter, (5) a default value of the first output parameter, and (6) an enumerated list of acceptable values of the first output parameter; and
- a twenty-third routine stored on the computer readable medium and adapted to receive from a user a value representing at least one of the characteristics of the first set of output parameter characteristics.

* * * * *

UNITED STATES PATENT AND TRADEMARK OFFICE
CERTIFICATE OF CORRECTION

PATENT NO. : 7,152,072 B2 Page 1 of 1
APPLICATION NO. : 10/338392
DATED : December 19, 2006
INVENTOR(S) : Patrick M. Dobrowski et al.

It is certified that error appears in the above-identified patent and that said Letters Patent is hereby corrected as shown below:

On the Title Page:

At field (56), Other Publications, PTO error, please add --International Search Report for PCT/US03/28378, mailed April 22, 2004.--

In the Specification:

At Column 4, line 40, "does" should be --do--.

At Column 10, line 57, "is a equal" should be --is equal--.

At Column 15, line 38, "activated clicking" should be --activated by clicking--.

At Column 17, line 26, "#TIE#" should be --#TIME#--.

At Column 18, line 47, "is found" should be --are found--.

Signed and Sealed this

Fourth Day of December, 2007

JON W. DUDAS
*Director of the United States Patent and Trademark Office*